United States Patent [19]

Imai et al.

[11] Patent Number: 5,426,587
[45] Date of Patent: Jun. 20, 1995

[54] MISFIRE DISCRIMINATING METHOD FOR AN ENGINE

[75] Inventors: Ryuichiro Imai; Izuru Kawahira, both of Musashino, Japan

[73] Assignee: Fuji Jukogyo Kabushiki Kaisha, Tokyo, Japan

[21] Appl. No.: 162,963

[22] Filed: Dec. 8, 1993

Related U.S. Application Data

[62] Division of Ser. No. 779,190, Oct. 10, 1991, Pat. No. 5,307,670.

[30] Foreign Application Priority Data

Nov. 1, 1990 [JP] Japan .................................. 2-298662
Feb. 20, 1991 [JP] Japan .................................. 3-26284

[51] Int. Cl.6 ........................................... F02D 15/00
[52] U.S. Cl. .......................... 364/431.05; 364/431.08; 364/431.07; 73/117.3; 73/116; 73/118.1; 123/419; 123/436; 123/425
[58] Field of Search ................... 364/431.01–431.11, 364/550, 424.03, 551.01, 565; 73/117.3, 116, 118.2, 35, 117.2, 118.1; 123/425, 414, 416, 419, 479, 436, 554, 435, 417

[56] References Cited

U.S. PATENT DOCUMENTS

| | | | |
|---|---|---|---|
| 4,932,379 | 6/1990 | Tang et al. ............................ | 123/436 |
| 5,041,980 | 8/1991 | Maddock et al. .............. | 364/431.03 |
| 5,095,742 | 3/1992 | James et al. ............................ | 73/116 |
| 5,116,259 | 5/1992 | Demizu et al. ...................... | 73/117.3 |
| 5,191,788 | 3/1993 | Nishimura ........................... | 73/117.3 |
| 5,216,915 | 6/1993 | Sakamoto ............................ | 73/117.3 |
| 5,241,480 | 8/1993 | Takaku et al. .................. | 364/431.07 |
| 5,268,843 | 12/1993 | Imai .................................. | 364/431.08 |
| 5,287,282 | 2/1994 | Imai .................................. | 364/431.08 |
| 5,303,158 | 4/1994 | Kuroda ............................. | 364/431.08 |
| 5,307,670 | 5/1994 | Imai et al. ............................ | 73/117.3 |

FOREIGN PATENT DOCUMENTS 3202660 9/1991 Japan ..................................... 73/116

*Primary Examiner*—Kevin J. Teska
*Assistant Examiner*—Jacques H. Louis-Jacques
*Attorney, Agent, or Firm*—Beveridge, DeGrandi, Weilacher & Young

[57] ABSTRACT

A method of discriminating the misfire of a multicylinder engine for each cylinder (FIG. 1A), comprising the steps of discriminating a cylinder number (#i) at a present combustion stroke (S101); calculating a present momentum at the present combustion stroke, in a period in which no combustive work is done (S105); computing a second momentum at a second stroke preceding the present combustion stroke two times, in a period in which no combustive work is done (S106); averaging the present and second momentums (S107); deriving a first momentum at a first stroke preceding the present combustion stroke one time, in a period in which no combustive work is done (S107); taking a difference between the averaged momentum and the first momentum (S107); setting a misfire judgement level from a map of combustion conditions in a function of said first momentum and engine load data (S108); and comparing the difference with the misfire judgement level (S109), thereby to judge the misfire condition for each cylinder without being affected by a manufactural allowance.

2 Claims, 22 Drawing Sheets

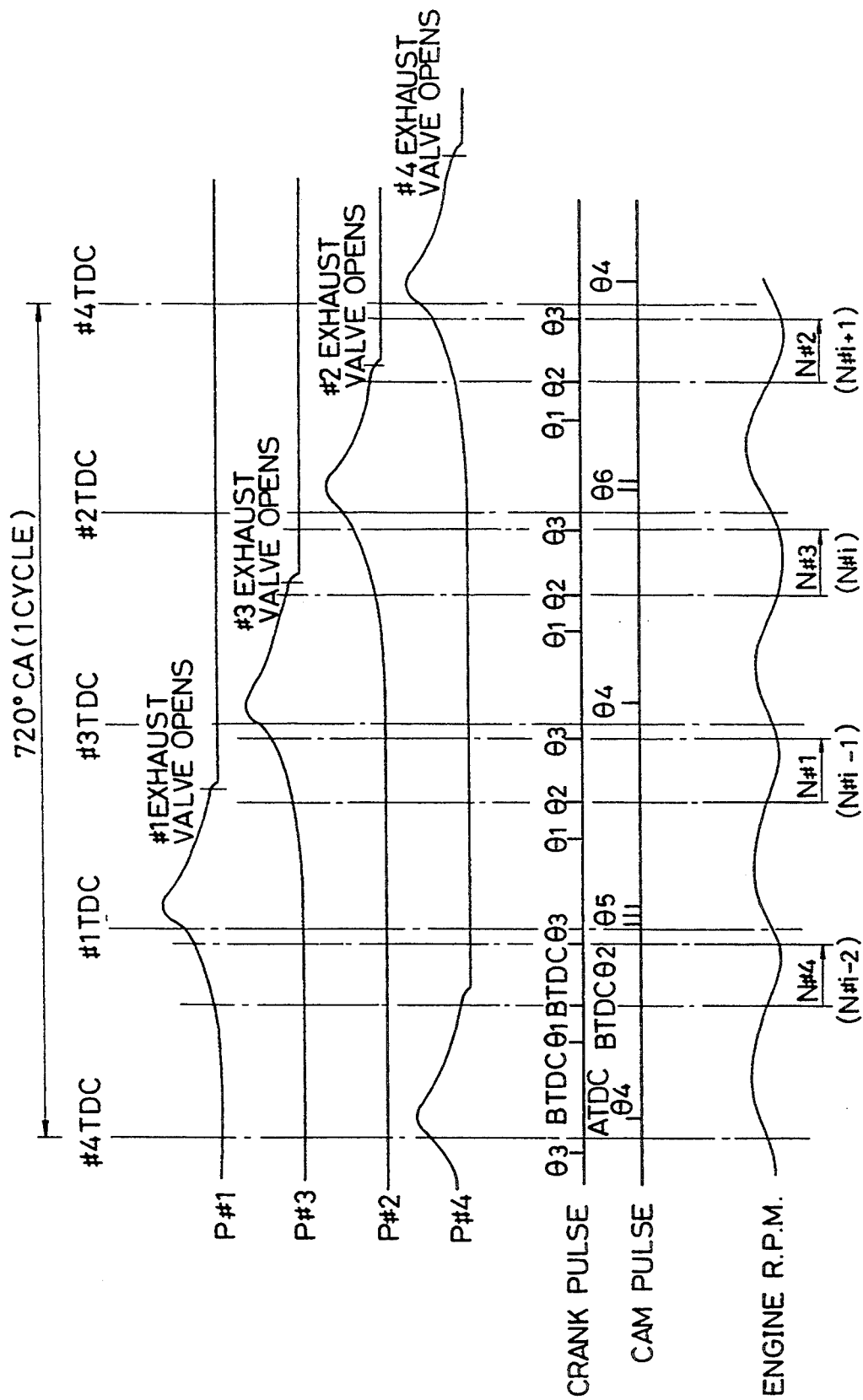

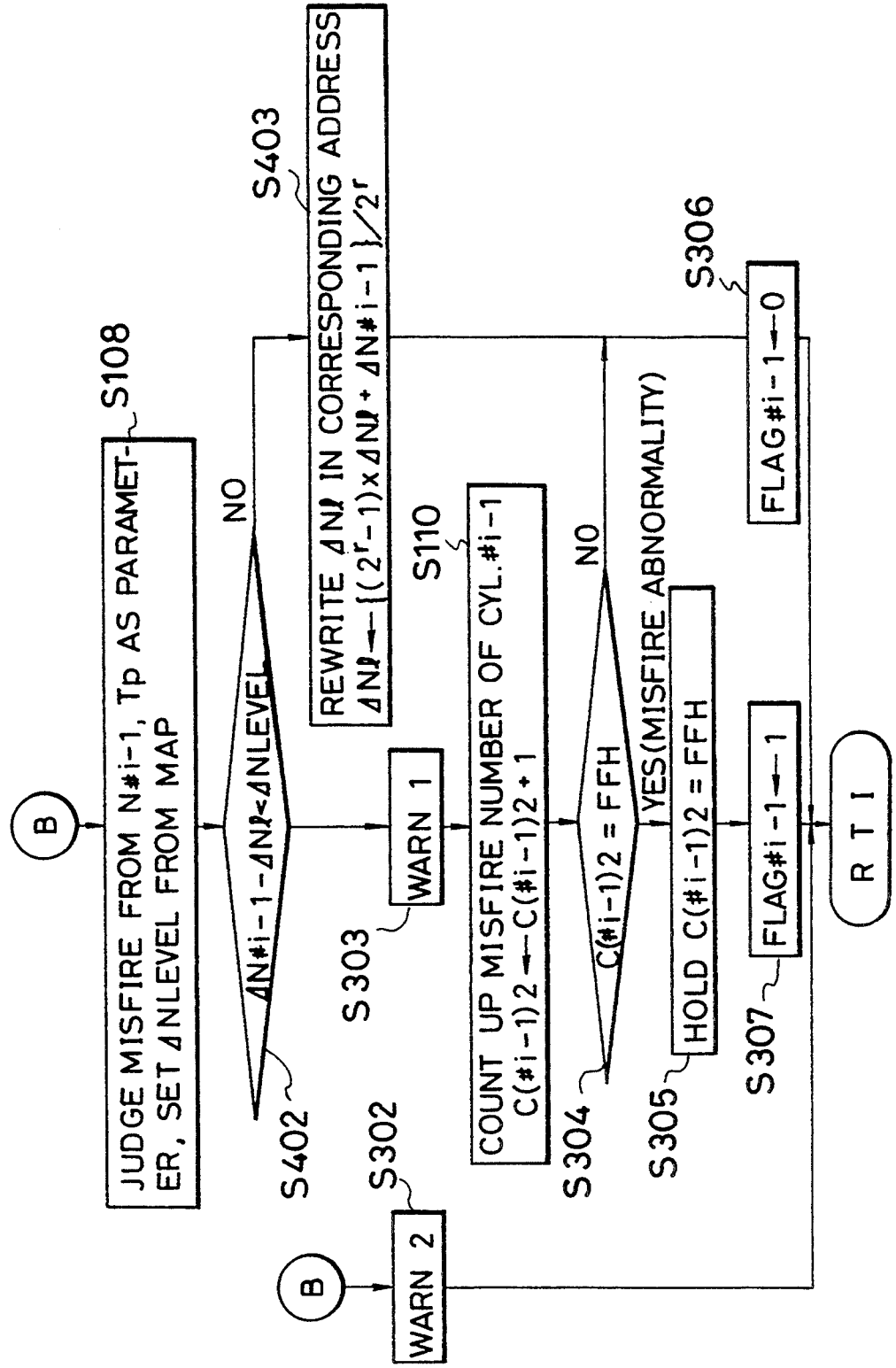

MISFIRE DISCRIMINATING
LEVEL MAP (MP∆NLEVEL)

MISFIRE DISCRIMINATING METHOD FOR AN ENGINE

CROSS-REFERENCE TO RELATED APPLICATIONS

This is a divisional application of application Ser. No. 07/779,190, filed on Oct. 10, 1991, now U.S. Pat. No. 5,307,670, which is relied on herein.

BACKGROUND OF THE INVENTION

1. Field of the Invention

The present invention relates to a misfire discriminating method for an engine. More particularly, it relates to a method of discriminating the misfire of an engine for each cylinder wherein the misfire condition of each cylinder is discriminated from the momentum change rate between cylinders. Also, it relates to such a method wherein the misfire judgement level of each cylinder is set with reference to a revolution fluctuation arising when fuel has been cut off, and wherein the misfire condition of each individual cylinder is discriminated on the basis of the misfire judgement level.

2. Description of the Prior Art

In general, it is ideal for producing a stable output that combustion in a multicylinder engine undergoes the same process every cycle. In the multicylinder engine, however, the combustion is liable to deviate due to the synergy of such drawbacks as listed below:

(1) Nonuniformity in the distribution rate of intake air attributed to the complication of the shape of an intake pipe, the interferences of the intake air among cylinders, etc.

(2) Some differences among the combustion temperatures of the individual cylinders attributed to cooling routes.

(3) Manufactural dispersions in the volumes of the combustion chambers of the individual cylinders, the shapes of pistons, etc.

(4) Slight discrepancies of the air fuel ratios of the individual cylinders caused by unequal fuel injection quantities ascribable to the manufactural errors of injectors, etc.

Heretofore, the combustion fluctuations among the cylinders have been suppressed to the minimum by the air fuel ratio controls and ignition timing controls of the individual cylinders. In a recent high-performance engine tending toward a higher output and a lower fuel cost, however, when any of the injectors, ignition plugs etc. has degraded or broken down, intermittent misfire is liable to arise and to incur lowering in the output.

Even when the intermittent misfire has occurred in one cylinder in the multicylinder engine, a driver often drives an automobile without noticing the misfire. Besides, it is difficult to judge during the drive whether the cause of the misfire is merely temporary or is the degradation or the like of any of the injectors, the ignition plugs etc.

Therefore, according to the official gazette of Japanese Patent Application Laid-open No. 258955/1986 by way of example, a comparison is made between the difference of the minimum value and maximum value of the r. p. m. of an engine corresponding to a cylinder at the previous combustion stroke and the difference of the minimum value and maximum value of the engine r. p. m. corresponding to the cylinder at the present combustion stroke. The combustion condition of the pertinent cylinder is discriminated, depending upon whether or not the discrepancy between the compared values falls within a preset reference value. In a case where abnormal combustion has occurred in excess of a predetermined number of times, a misfire is judged, and warning is given.

With the prior-art technique, the combustion fluctuation of each cylinder is obtained from the the differences between the minimum engine r. p. m. and maximum engine r. p. m. values of the combustion stroke cylinder. During combustion, however, the engine speed rises abruptly, and the engine is loaded relatively heavily, so that the fluctuation of an acceleration increases. Accordingly, it is difficult to specify the maximum value of the engine r. p. m., and a precision error developing at the judgement of the misfire enlarges.

Meanwhile, the combustion characteristics of an engine deviate, not only among cylinders, but also among individual engines on account of the manufactural errors of components, etc.

When the reference value for comparing the revolution fluctuations is set as an absolute value as in the prior-art technique, it changes relatively every engine due to the deviation of the combustion characteristics of the individual engines, and it becomes difficult to precisely grasp abnormal combustion in some of the engines.

In an engine having a small number of cylinders, the combustion intervals between the cylinders are comparatively long, and hence, the difference of the revolution fluctuations is large. Therefore, even when the reference value is set as the absolute value, the deviation of the combustion characteristics of the individual engines do not exert great influence on the misfire judgement. In contrast, in an engine having a large number of cylinders, the combustion intervals are short, and the difference of the revolution fluctuations decreases to that extent. Therefore, when the judgement level (the reference value) is set as the absolute value beforehand, the deviation of the combustion characteristics of the individual engines affects the precision of the misfire judgement greatly.

Especially in a high speed region, the fluctuation difference becomes small. Therefore, when the judgement level changes relatively every engine, the precise misfire judgment becomes very difficult.

By way of example, with a technique in the official gazette of Japanese Patent Application Laid-open No. 82534,1984, a differentiated r. p. m. value $\Delta N\#i$ ($\Delta N\#i = NH\#i - NL\#i$) which is the difference between the instantaneous engine r. p. m. $NL\#i$ of each of cylinders $\#i$ ($i = 1$–$4$ in a four-cylinder engine) before a combustion stroke and the instantaneous engine r. p. m. $NH\#i$ thereof after the combustion stroke is obtained every cylinder, and the differentiated r. p. m. value $\Delta N\#i$ of each cylinder $\#i$ is subsequently compared with the average value $\Delta NA$ of the differentiated r. p. m. values $\Delta N\#i$ of all the cylinders $\#i$, thereby to grasp the combustion condition of each cylinder $\#i$.

With the prior-art technique, however, a reference value is the average differentiated r. p. m. value $\Delta NA$ of all the cylinders, which in itself is always prone to fluctuate depending upon the combustion conditions. When the average differentiated r. p. m. value $\Delta NA$ of all the cylinders has fluctuated, that combustion condition of each cylinder which is estimated with reference to the average differentiated r. p. m. value $\Delta NA$ of all the cylinders comes to involve the combustion condition factors of the other cylinders in the case of setting this value ΔNA, and it becomes difficult to precisely grasp the misfire of each cylinder.

Meanwhile, with a technique wherein as disclosed in the official gazette of Japanese Patent Application Laid-open No. 268956/1988, misfire is decided from the difference of momentums before and after combustion (a "revolving circumferential difference" in the official gazette), the misfire is simply judged on condition that the momental difference is minus. In, for example, the running of an automobile at a constant speed, however, the momental difference sometimes becomes minus under the influence of the friction of an engine in spite of normal firing (normal combustion), and the misfire might be erroneously decided.

SUMMARY OF THE INVENTION

The present invention has been made in view of the above circumstances and has for its first object to provide a method of discriminating the misfire of an engine for each cylinder, which method can precisely detect the misfire condition without involving the combustion condition factors of the other cylinders and without being affected by, not only the combustive deviation among the cylinders, but also the manufactural dispersion among the individual engines.

It is the second object of the present invention to eliminate also the influence of the friction of the engine in the above method.

In one aspect of performance of the present invention for accomplishing the first object, a misfire discriminating method for an engine with a crankshaft for outputting power and a camshaft for actuating values having, a crank plate connected to said crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle and said cam angle for controlling an ignition timing of said engine, comprises the steps of discriminating a cylinder number at a combustion stroke; calculating a present momentum at said present combustion stroke, in a period in which no combustive work is done; computing a second momentum at a second stroke preceding said present combustion stroke two times, in a period in which no combustive work is done; averaging said present and second momentums; deriving a first momentum at a first stroke preceding said present combustion stroke one time, in a period in which no combustive work is done; taking a difference between said averaged momentum and said first momentum; setting a misfire judgement level from a map of combustion conditions in a function of said first momentum and engine load data; comprising said difference with said misfire judgement level; and judging exactly a misfire condition for each cylinder without being affected by a manufactural allowance.

According to this aspect of performance, the combustion condition of the cylinder at the combustion stroke preceding the present combustion stroke one time is decided with reference to the average value of the momentums of the cylinders at the combustion strokes before and after the combustion stroke of the pertinent cylinder to-be-discriminated, the momentums developing in the periods in which no combustive work is done, and it is compared with the misfire judgement level set in correspondence with the engine conditions of the cylinder at the combustion stroke preceding the present combustion stroke one time, thereby to discriminate the misfire condition of the cylinder at the combustion stroke preceding the present combustion stroke one time. Therefore, the misfire condition can be precisely detected without being affected by any of the combustion deviation among the cylinders, the manufactural dispersion among the individual engines, etc.

In another aspect of performance of the present invention for accomplishing the first object, a misfire discriminating method for an engine with a crankshaft for outputting power and a camshaft for actuating valves having, a crank plate connected to said crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle and said cam angle for controlling an ignition timing of said engine, comprises the steps of discriminating a cylinder number at a combustion stroke; calculating a present momentum at said present combustion stroke, in a period in which no combustive work is done; computing a third momentum at a stroke preceding said present combustion stroke one time, in a period in which no combustive work is done; estimating a fourth momentum at said stroke preceding said present combustion stroke one time, in a period in which no combustive work is done; averaging said third and fourth momentums; taking a difference between said averaged momentum and said first momentum; setting a misfire judgement level form a map of combustion conditions in a function of said first momentum and engine load data; comparing said difference with said misfire judgement level; and judging exactly a misfire condition for each cylinder without being affected by a manufactural allowance.

According to this aspect of performance, the combustion condition of the cylinder at the present combustion stroke is decided with reference to the average value of the momentum and the estimative momentum of the cylinders at the combustion strokes before and after the combustion stroke of the pertinent cylinder to-be-discriminated, the momentums developing in the periods in which no combustive work is done, and it is compared with the misfire judgement level set in correspondence with the engine operation conditions of the cylinder at the present combustion stroke, thereby to discriminate the misfire condition of the cylinder at the present combustion stroke. Therefore, the misfire condition can be precisely detected without being affected by any of the combustion deviation among the cylinders, the manufactural dispersion among the individual engines, etc.

In one aspect of performance of the present invention for accomplishing the second object, a misfire discriminating method for an engine with a crankshaft for outputting power and a camshaft for actuating valves having, a crank plate connected to said crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle and said cam angle for controlling an ignition timing of said engine, comprises the steps of discriminating a cylinder number at a combustion stroke; calculating a present momentum at said present combustion stroke in a predetermined period at cutoff of fuel; computing a second momentum at a second stroke preceding said present combustion stroke two times, in a predetermined period at cutoff of the fuel; averaging said present and second momentums; taking a difference between said averaged momentum, and a third momentum at a third stroke preceding said present combustion stroke one time, in a predetermined period at cutoff of the fuel; setting a discrimination value for a combustion condition at said third stroke corresponding to the fuel cutoff, on the basis of said difference; reading a misfire judgement level with said third momentum as a parameter, out of a predetermined address of a misfire judgement level map which corresponds to a cylinder of said third stroke; rewriting said misfire judgement level with said combustion condition discriminating value; thereafter calculating a fourth momentum at said present combustion stroke in a predetermined period at injection of the fuel; computing a fifth momentum at said second stroke preceding said present combustion stroke two times, in a predetermined period at injection of the fuel; averaging said fourth and fifth momentums; taking a second difference between said average of said fourth and fifth momentums, and a sixth momentum at said third stroke in a predetermined period at injection of the fuel; setting a second discrimination value for a combustion condition at said third stroke corresponding to the fuel injection, on the basis of said second difference; reading said rewritten misfire judgement level with said sixth momentum as the parameter, out of said predetermined address of said misfire judgement level map; and comparing said second combustion condition discriminating value with said rewritten misfire judgement level, thereby to judge a misfire condition of said cylinder at said third stroke.

According to this aspect of performance, in case of discriminating the misfire of the cylinder at the combustion stroke preceding the present combustion stroke one time, first of all, in order to detect a friction factor which is influential on the pertinent cylinder of the engine, the combustion condition discriminating value is found from the difference between the average value of the momentums of cylinders at the combustion strokes before and after that combustion stroke of the cylinder which precedes the present combustion stroke one time, the momentums developing in the predetermined periods at the fuel cutoff, and the momentum of the cylinder at the combustion stroke preceding the present combustion stroke one time, the momentum developing in the predetermined period. Subsequently, the misfire judgement level stored at the address of the corresponding one of misfire judgement level maps of the respective cylinders is read out using as the parameter the momentum of the cylinder at the combustion stroke preceding the present combustion stroke one time and is amended with the combustion condition discriminating value, and it is rewritten into the amended magnitude, thereby to learn the misfire judgment level. Thereafter, the combustion condition discriminating value is found from the difference between the average value of the momentums of the cylinders at the combustion strokes before and after that combustion stroke of the cylinder which precedes the present combustion stroke one time, the momentums developing in the predetermined periods at the fuel injection, and the momentum of the cylinder at the combustion stroke preceding the present combustion stroke on time, the momentum developing in the predetermined period, and it is compared with the misfire judgement level which is read out using as the parameter the momentum of the cylinder at the combustion stroke preceding the present combustion stroke one time and which is stroked at the predetermined address of the misfire judgement level map of the cylinder at the combustion stroke preceding the present combustion stroke one time. In a case where the combustion condition discriminating value is smaller than the misfire judgement level, the pertinent cylinder is judged to have misfired.

In another aspect of performance of the present invention for accomplishing the second object, a misfire discriminating method for an engine with a crankshaft for outputting power and a camshaft for actuating valves having, a crank plate connected to sad crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle of said cam angle for controlling an ignition timing of said engine, comprises the steps of discriminating a cylinder number of a cylinder at a combustion stroke; calculating a present momentum at said present combustion stroke in a predetermined period at cutoff of fuel; computing a second momentum at a second stroke preceding said present combustion stroke one time, in a predetermined period at cutoff of the fuel; taking a difference between said present and second momentums; setting a discrimination value for a combustion condition at said present combustion stroke corresponding to the fuel cutoff, on the basis of said difference; reading a misfire judgement level with said present momentum as a parameter, out of a predetermined address of a misfire judgement level map which corresponds to said cylinder of said present stroke; rewriting said misfire judgment level with said combustion condition discriminating value; thereafter calculating a third momentum at said present combustion stroke in a predetermined period at injection of the fuel; computing a fourth momentum at said second stroke preceding said present combustion stroke one time, in a predetermined period at injection of the fuel; taking a second difference between said third and fourth momentums; setting a second discrimination value for a combustion condition at said present stroke corresponding to the fuel injection, on the basis of said second difference; reading said rewritten misfire judgement level with said third momentum as the parameter, out of said predetermined address of said misfire judgement level map; and comparing said second combustion condition discriminating value with said rewritten misfire judgement level, thereby to judge a misfire condition of said cylinder at said present stroke.

According to this aspect of performance, in case of discriminating the misfire of the pertinent cylinder at the present combustion stroke, first of all, in order to detect a friction factor which is influential on the pertinent cylinder of the engine, the combustion condition discriminating value is found from the difference between the momentums of the cylinder at the present combustion stroke and a cylinder at the combustion stroke preceding the present combustion stroke one time, the momentums developing in the predetermined periods at the fuel cutoff. Subsequently, the misfire judgement level stored at the address of the corresponding one of misfire judgement level maps of the respective cylinders is read out using as the parameter the momentum of the cylinder at the present combustion stroke and is amended with the combustion condition discriminating value, and it is rewritten into the amended magnitude, thereby to learn the misfire judgment level. Thereafter, the combustion condition discriminating value is found from the difference between the momentums of the cylinder at the present combustion stroke and the cylinder at the combustion stroke preceding the present combustion stroke one time, the momentums developing in the predetermined periods at the fuel injection, and it is compared with the misfire judgement level which is read out using as the parameter the momentum of the cylinder at the present combustion stroke and which is stored at the predetermined address of the misfire judgement level map of the cylinder at the present combustion stroke. In a case where the combustion condition discriminating value is smaller than the misfire judgement level, the pertinent cylinder is judged to have misfired.

BRIEF DESCRIPTION OF THE DRAWINGS

FIGS. 1A thru 8 illustrate the first embodiment of the present invention, in which FIGS. 1A and 1B are flow charts showing steps for discriminating the misfire of each individual cylinder, FIGS. 2 and 3 are conceptual diagrams showing a basic method of discriminating the misfire of each individual cylinder, FIG. 4 is a schematic diagram of an engine control system, FIG. 5 is a front view of a crank rotor and a crank angle sensor, FIG. 6 is a front view of a cam rotor and a cam angle sensor, FIG. 7 is a conceptual diagram of a misfire judgement level, and FIG. 8 is a time chart showing pressure fluctuations in cylinders, crank pulses, cam pulses and engine r. p. m. fluctuations;

FIGS. 11A thru 12 illustrate the fourth embodiment of the present invention, in which FIGS. 11A and 11B are flow charts showing steps for judging the misfire of each individual cylinder, and FIG. 12 is a conceptual digram of combustion condition learning value maps;

FIGS. 13A and 13B are flow charts showing steps for judging the misfire of each individual cylinder according to the fifth embodiment of the present invention;

DESCRIPTION OF THE PREFERRED EMBODIMENTS

Now, embodiments of the present invention will be described with reference to the drawings.

Figure 1A:
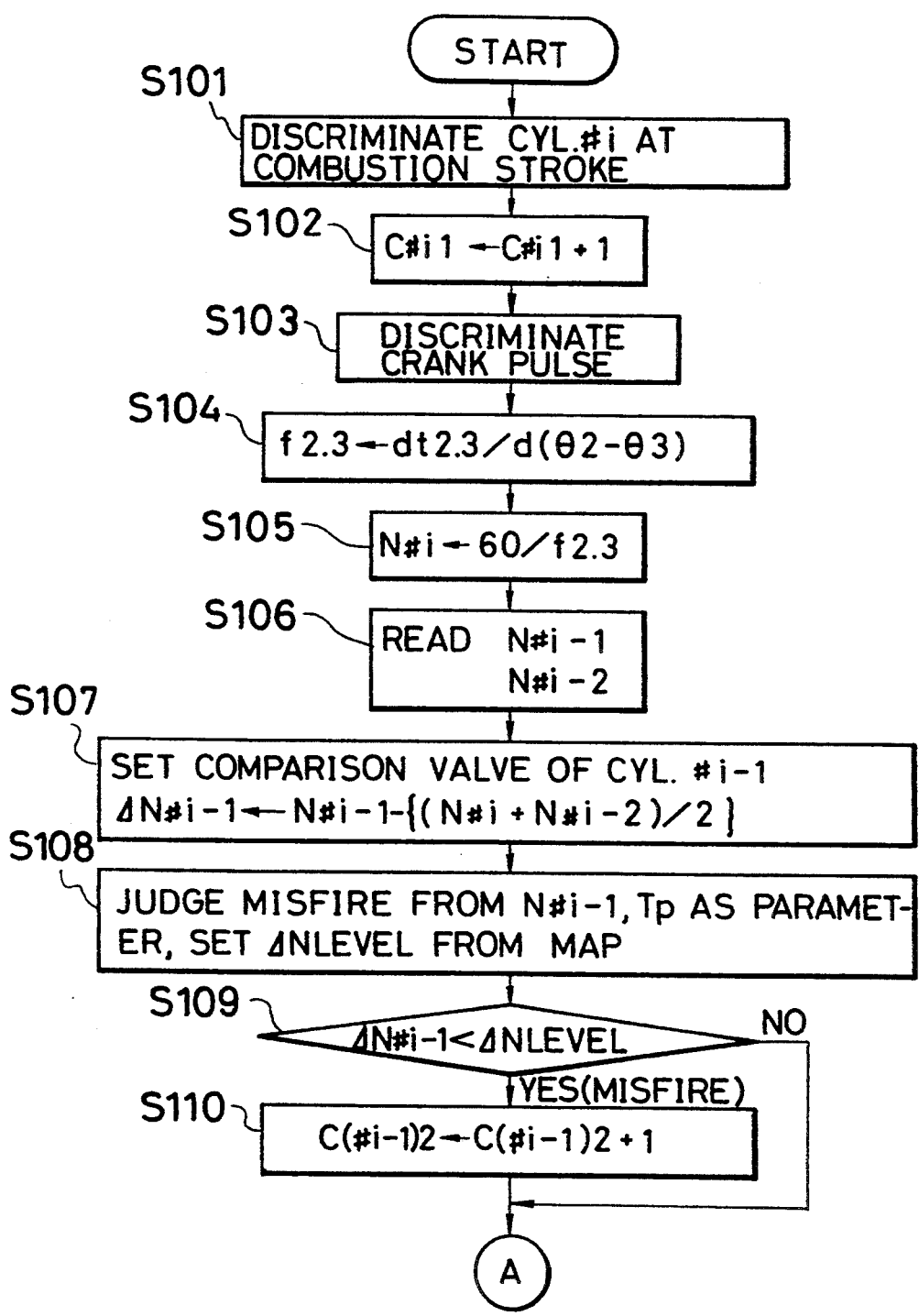
Figure 1B:
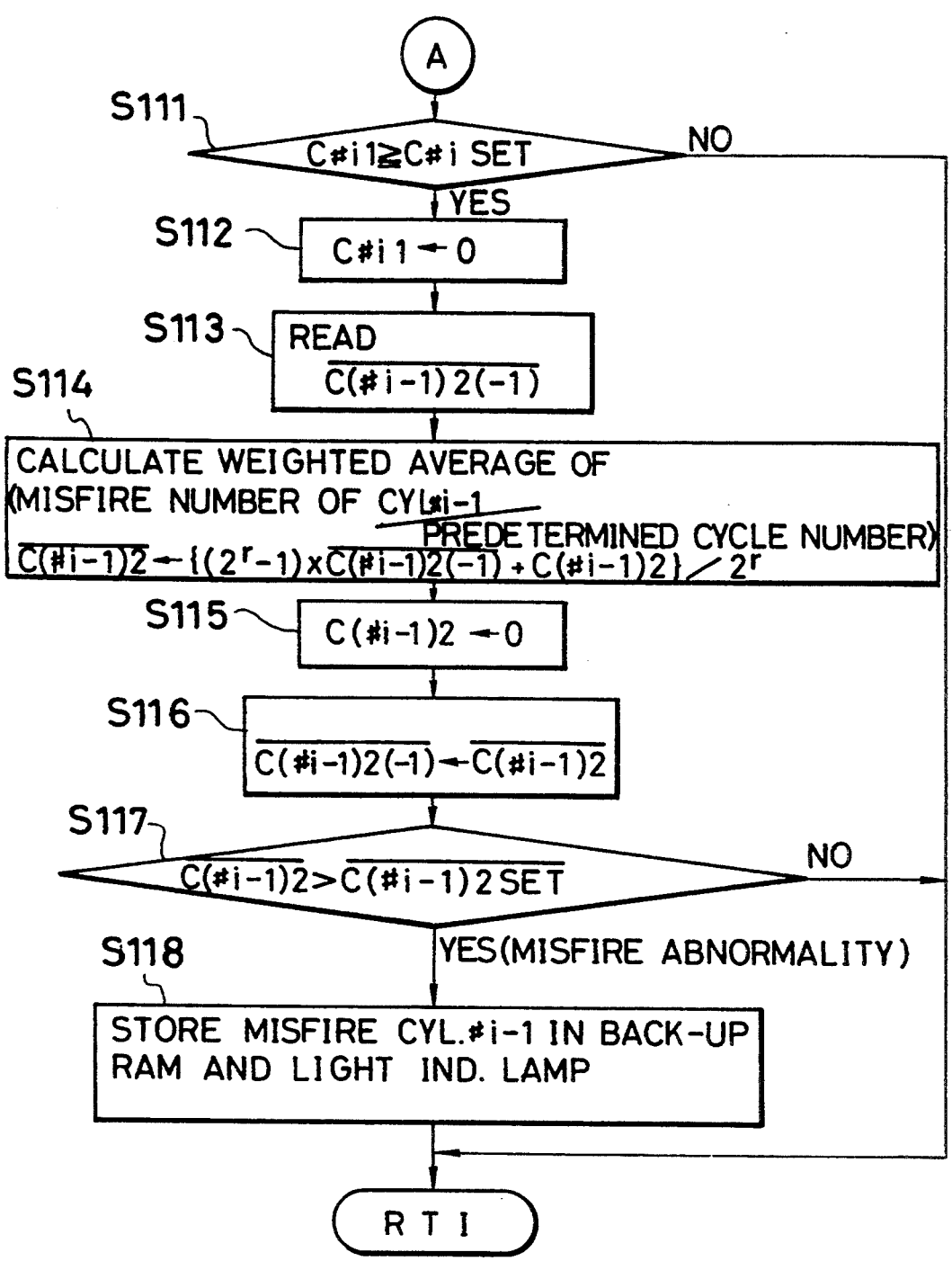
Figure 2:
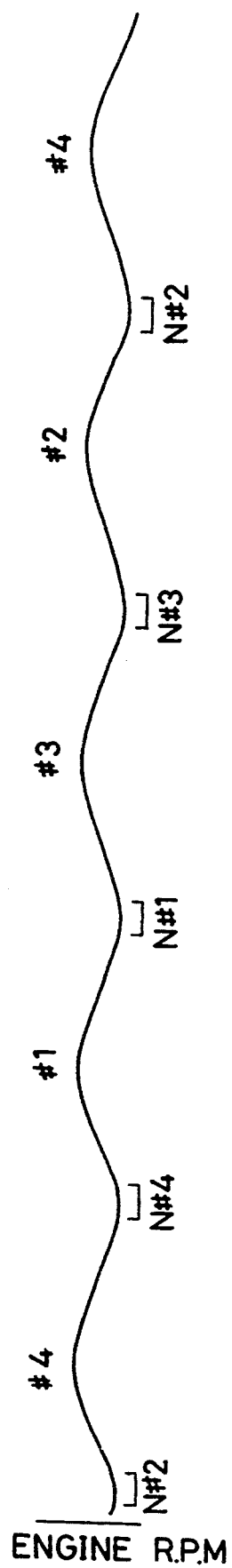
Figure 3:
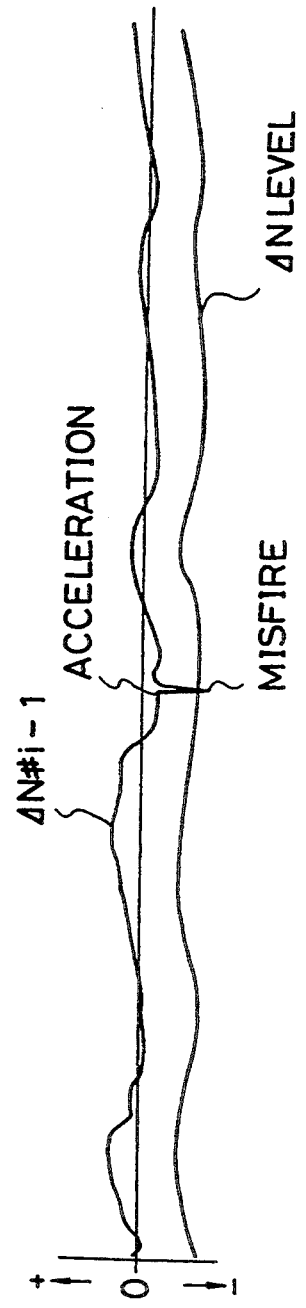
Figure 4:
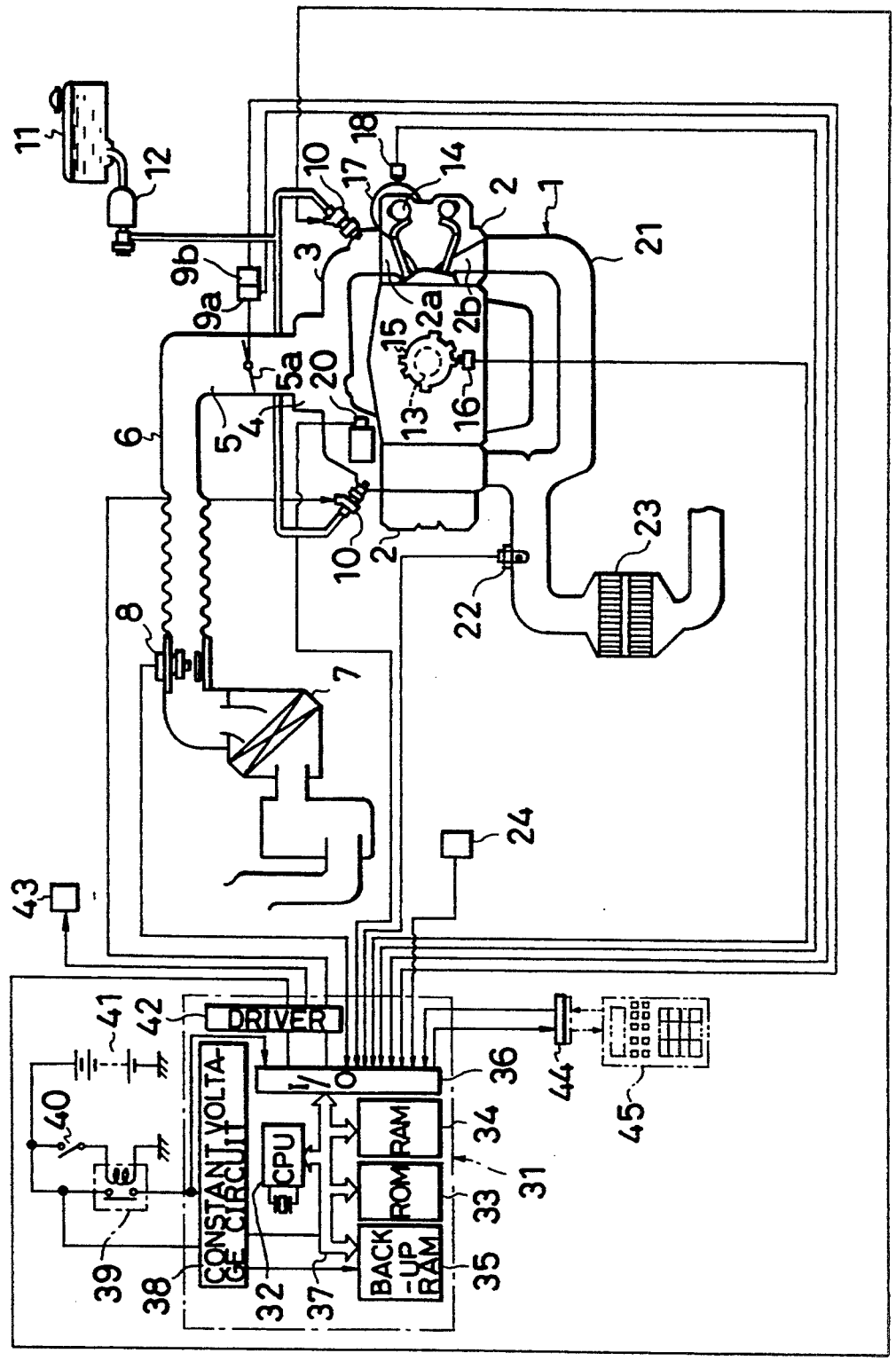
Figure 5:
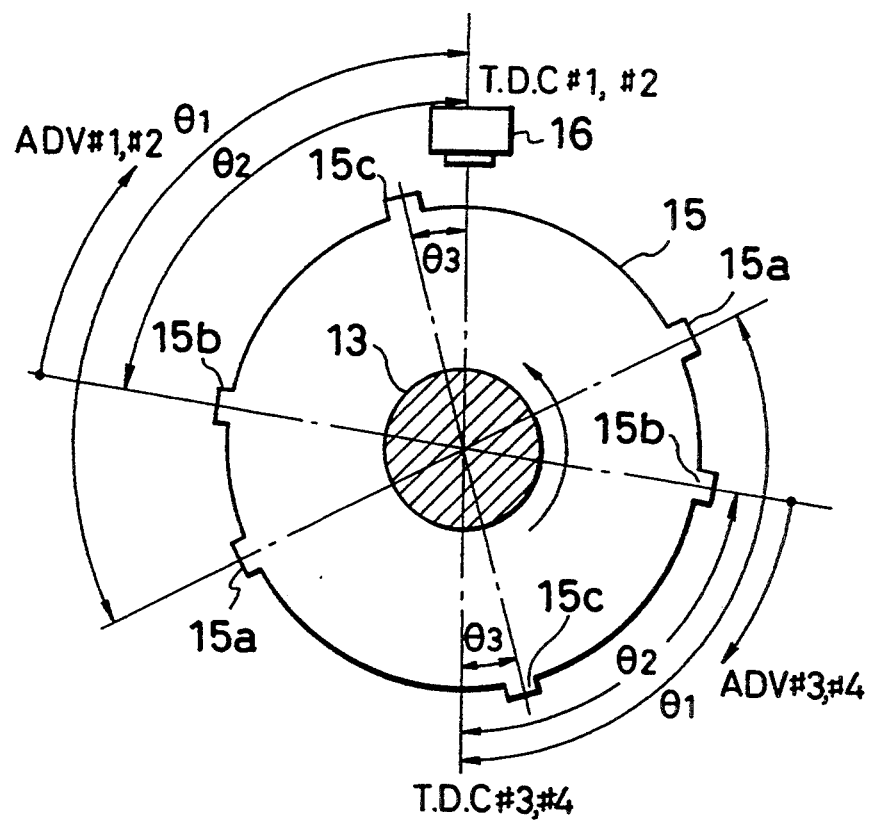
Figure 6:
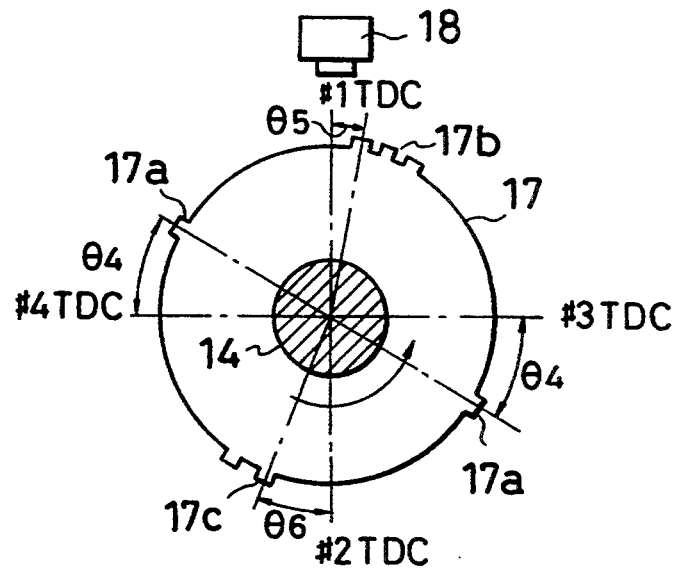
Figure 7:
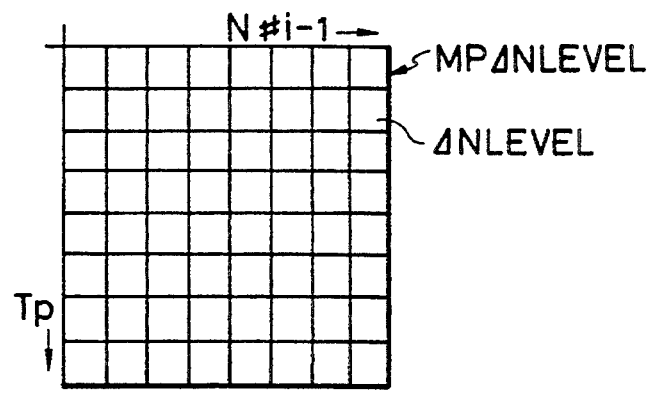

FIGS. 1A thru 8 illustrate the first embodiment of the present invention, in which FIGS. 1A and 1B are flow charts showing steps for discriminating the misfire of each individual cylinder, FIGS. 2 and 3 are conceptual diagrams showing a basic method of discriminating the misfire of each individual cylinder, FIG. 4 is a schematic diagram of an engine control system, FIG. 5 is a front view of a crank rotor and a crank angle sensor, FIG. 6 is a front view of a cam rotor and a cam angle sensor, FIG. 7 is a conceptual diagram of a misfire judgement level, and FIG. 8 is a time chart showing pressure fluctuations in cylinders, crank pulses, cam pulses and engine r. p. m. fluctuations.

Construction

Numeral 1 in FIG. 4 indicates an engine, and a four-cylinder horizontally-opposed engine is shown in the figure. An intake manifold 3 is held in communication with an intake port 2a formed in the cylinder head 2 of the engine 1, a throttle chamber 5 is held in communication with the upper stream of the intake manifold 3 through an air chamber 4, and an air cleaner 7 is mounted upstream of the throttle chamber 5 through an intake pipe 6.

In addition, an intake air quantity sensor (in the figure, a hot wire type air flow meter) 8 is incorporated in the part of the intake pipe 6 immediately downstream of the air cleaner 6. Further, the throttle chamber 5 is furnished with a throttle value 5a, to which a throttle opening-degree sensor 9a and an idling switch 9b for detecting the full closure of the throttle value are joined.

Besides, multipoint injectors (hereinbelow, abbreviated to "MPIs") 10 are dispsoed immediately upstream of the intake ports 2a of the intak manifold 3 corresponding to respective cylinders. Also, numeral 11 indicates a fuel tank, and numeral 12 a fuel pump for feeding fuel to the MPIs 10.

Besides, a crank rotor 15 is secured on the crankshaft 13 of the engine 1, and a crank angle sensor 16 which includes an electromagnetic pickup or the like for detecting projections (alternatively, slits) corresponding to predetermined cranks angles is mounted in opposition to the outer periphery of the crank rotor 15. Further, a cam rotor 17 is joined to a camshaft 14 which revolves at a rate of ½ relative to the crankshaft 13, and a cam angle sensor 18 is mounted in opposition to the outer periphery of the cam rotor 17.

As shown in FIG. 5, the outer periphery of the crank rotor 15 is formed with the projections (or slits) 15a, 15b and 15c. The respective projections 15a, 15b and 15c are formed at positions $\theta 1$, $\theta 2$ and $\theta 3$ before the top dead center (BTDC) of compression in each cylinder. A period $f_{1,2}$ (here, $f = 1/\omega$, $\omega$: angular velocity) is calculated from a time interval in which the second between the projections 15a and 15b passes, while a period $f_{2,3}$ is calculated from a time interval in which the section between the projections 15b and 15c passes. Further, the projection 15b indicates a reference crank angle in the case of setting an ignition timing.

In general, the ignition timing of idling lies near 20° in terms of the BTDC crank angle. Even when the cylinder is ignited with this crank angle, the combustion pressure does not abruptly rise before about 10° in terms of the BTDC crank angle yet.

Besides, as shown in FIG. 8, in the embodiment, the value opening timing of the exhaust value of each cylinder is set at the side of a somewhat retarded angle with respect to the ignition reference crank angle BTDC $\theta 2$ of the next combustion cylinder. Since, however, the combustion pressure usually lowers abruptly immediately after the opening of the exhaust value, it exerts almost no influence at the crank angle BTDC $\theta 3$.

Accordingly, when the crank angle $\theta 3$ of the projection 15c is set at an advanced angle side with respect to the BTDC CA of 10°, the section between the crank angles BTDC $\theta 2$ and $\theta 3$ of the respective projections 15b and 15c is hardly influenced by the combustion between the cylinders. That is, a work based on the combustion between the cylinder at a combustion stroke and the cylinder at the next combustion stroke is not done in the section.

Also, as shown in FIG. 6, the outer periphery of the cam rotor 17 is formed with projections (alternatively, slits) 17a, 17b and 17c for discriminating the cylinders. The projections 17a are respectively formed at the positions $\theta 4$ after the top dead centers (ATDC) of compression, of the cylinders #3 and #4. Besides, the projection group 17b is configured of three projections, the first one of which is formed at the position $\theta 5$ after the top dead center (ATDC) of compression, of the cylinder #1. Further, the projection gruop 17c is configured of two projection, the first one of which is formed at the position $\theta 6$ after the top dead center (ATDC) of compression, of the cylinder #2.

By the way, in the illustrated embodiment, there are held $\theta 1=97°$ CA, $\theta 2=65°$ CA, $\theta 3=10°$ CA, $\theta 4=20°$ CA, $\theta 5=5°$ CA, $\theta 6=20°$ CA and $\theta(2-3)=55°$ CA. Owing to this arrayal, as indicated in FIG. 8, in a case where the cam angle sensor 18 has detected cam pulses at the angle $\theta 5$ (the projections 17b) by way of example, it can be discriminated that a crank pulse to be subsequently detected by the crank angle sensor 16 is a signal which indicates the crank angle of the cylinder #3.

Also, in a case where a cam pulse at the angle $\theta 4$ (the projection 17a) has been detected after the cam pulses of the angle $\theta 5$, it can be discriminated that the subsequent crank pulse to be detected by the crank angle sensor 16 indicates the crank angle of the cylinder #2. Similarly, it can be discriminated that a crank pulse after the detection of cam pulses at the angle $\theta 6$ (the projections 17c) indicates the crank angle of the cylinder #4. Besides, in a case where a cam pulse at the angle $\theta 4$ (the projection 17a) has been detected after the cam pulses of the angle $\theta 6$, it can be discriminated that a crank pulse to be subsequently detected indicates the crank angle of the cylinder #1.

Further, it can be discriminated that the crank pulse which is detected by the crank angle sensor 16 after the detection of the cam pulse(s) by the cam angle sensor 18 indicates the reference crank angle ($\theta 1$) of the corresponding cylinder.

Incidentally, the crank angle sensor 16 and the cam angle sensor 18 constitute crank angle detection means.

The crank angle detection means may well be constructed only of the cam angle sensor 18 by changing the cam pulse pattern.

Besides, a cooling-water temperature sensor 20 is confronted to a cooling water passage (not shown) which defines a riser formed in the intake manifold 3 of the engine, while an $O_2$ sensor 22 is confronted to an exhaust pipe 21 which communicates with the exhaust port 2b of the cylinder head 2. By the way, numeral 23 designates a catalyst converter, and numeral 24 a vehicle speed sensor.

Circuit Arrangement of Electronic Control Unit

Meanwhile, numeral 31 designates an electronic control unit which is configured of a microcomputer etc. A CPU (central processing unit) 32, a ROM 33, a RAM 34, a back-up RAM (nonvolatile RAM) 35 and an I/O interface 36, which constitute the electronic control unit 31, are interconnected through bus lines 37 and are fed with predetermined stabilized voltages from a voltage regulator circuit 38.

The voltage regulator circuit 38 is connected to battery means 41 through a control relay 39. When the relay contact of the control relay 39 has been closed by the turn-ON of a key switch 40, the circuit 38 feeds, the controlling supply voltages to the respective portions, Simultaneously, it is directly connected to the battery means 41, thereby to feed a back-up supply voltage to the back-up RAM 35 even when the key switch 40 has been turned OFF.

In addition, the sensors 8, 9a, 16, 18, 20, 22, and 24 and the idling switch 9b are connected to the input ports of the I/O interface 36, and the plus terminal of the battery means 41 is also connected to the input port of the I/O interface 36 so as to monitor the terminal voltage thereof. On the other hand, the MPIs 10 and warning means, such as an indicator lamp, 43 dispsoed on an instrument panel or the like not shown are connected to the output portsof the I/O interface 36 through a driver circuit 42.

A control program, fixed data, etc. are stored in the ROM 33. The fixed data includes misfire judgement level maps MP$\Delta$N$_{LEVEL}$ to be described later.

Besides, the data of the output signals of the sensors subjected to processing and data arithmetically processed by the CPU 32 are stored in the RAM 34. Further, trouble data times of the misfire judgement data of each cylinder, etc. to be described later are stored in the back-up RAM 35 in such a manner that, since this RAM is normally fed with the supply voltage irrespective of the state of the key switch 40, the stored contents do not disappear even when the key switch 40 has been turned OFF to stop the operation of the engine.

The trouble data can be read out by connecting a trouble diagnosing serial monitor 45 to a trouble diagnosing connector 44 which is connected to the output port of the I/O interface 36.

Further, in the CPU 32, fuel injection pulse widths Ti for the MPIs 10, etc. are calculated for the individual cylinders in conformity with the control program stored in the ROM 33 and on the basis of the various sorts of data stored in the RAM 34 and the back-up RAM 35.

In the electronic control unit 31, the misfires of the cylinders #i (i=1–4) are individually judged in addition to ordinary fuel injection controls.

The basic concept of the method of discriminating the misfire for each individual cylinder will be elucidated with reference to FIGS. 2 and 3.

FIG. 2 shows engine r. p. m. fluctuations. In the case of the four-cylinder engine by way of example, a cylinder #i at a combustion stroke changes-over every 180° CA in order of ignition (for example, #1→#3→#2→#4). Therefore, successive combustion strokes do not overlap each other, and a period or section in which no combustive work is done and which is not affected by the combustion of the cylinders intervenes after the end of the combustion of the cylinder #i at the combustion stroke and before the start of the combustion of the next cylinder #i+1 at the combustion stroke.

As indicated in FIG. 2 by way of example, N#1-N#4 are respectively let denote engine r. p. m. values corresponding to the instantaneous momentums of the cylinders #1-#4 in the periods or sections in which no combustive work is done. When misfire has occurred in a certain cylinder #i, the output of the engine after the combustion lowers abruptly.

In this embodiment, with note taken of the fact that a very intense correlation exists between the combustion condition of each cylinder #i and the engine r. p. m. N#i thereof, the combustion condition is discriminated for each cylinder, and the value of the discrimination is compared with the misfire judgement level $\Delta N_{LEVEL}$, thereby intending to judge the misfire condition of the pertinent cylinder #i.

More specifically, in the misfire discriminating method, the average value (N#i−2+N#i)/2 between the engine r. p. m. N#i of the cylinder #i at the present combustion stroke and the engine r. p. m. N#i−2 of the cylinder #i−2 at a combustion stroke preceding the present combustion stroke two times is first compared with the engine r. p. m. N#i−1 of the cylinder #i−1 at a combustion stroke preceding the present combustion stroke one time. As indicated in FIG. 3, the compared value $\Delta$N#i−1 [$\Delta$N#i−1=N#i−1−(N#i−2+N#i)/2] is compared with the misfire judgement level $\Delta N_{LEVEL}$ set in accordance with the operating condition of the pertinent cylinder #i−1. In a case where the compared value $\Delta$N#i−1 is less than the misfire judgement level $\Delta N_{LEVEL}$, the misfire is judged.

Herein, the comparison value for the discrimination of the misfire is set on the basis of the average value of the engine r. p. m. values of the cylinders adjoining each other in the order of ignition. Therefore, a substantially constant value (under a normal condition, a value close to zero) can be obtained, not only in the running of the automobile at a constant speed, but also midway of the acceleration thereof.

Now, how to calculate the comparison value $\Delta$N#i−1 of each cylinder #i−1 at the combustion stroke preceding the present combustion stroke one time will be concretely indicated:

$$\Delta N\#1 = N\#1 - (N\#4 + N\#3)/2$$

$$\Delta N\#3 = N\#3 - (N\#1 + N\#2)/2$$

$$\Delta N\#2 = N\#2 - (N\#3 + N\#4)/2$$

$$\Delta N\#4 = N\#4 - (N\#2 + N\#1)/2$$

The relationship between the engine r. p. m. N in the period or section in which no combustive work is done, and the combustion condition of the cylinder, namely, the illustrated average effective pressure Pi will be indicated as an equation below.

First, the state in which the engine is rotating is expressed by the following equation:

$$I \cdot \frac{2\pi}{60} \cdot \frac{dN}{dt} = Ti - Tf \tag{1}$$

I: moment of inertia,
N: engine r. p. m.,
Ti: instructed torque,
Tf: friction torque.

Eq. (1) is simplified into:

$$\frac{dN}{dt} \propto Ti - Tf \tag{2}$$

Further, in terms of pressures, this equation is expressed by:

$$\frac{dN}{dt} \propto Pi - Pf \tag{3}$$

Pi: illustrated average effective pressure,
Pf: frictional-loss effective pressure.

The value dN/dt of Eq. (3) was experimentally found on the basis of the engine r. p. m. N#i of each cylinder #i after the combustion and the temporal change $\Delta$T of the section for detecting this engine r. p. m. N#i (equivalent to, for example, a section ($\theta 2-\theta 3$) in FIG. 6). As a result, a very intense correlation was exhibited.

Accordingly, the illustrated average effective pressure Pi, namely, the combustion condition can be estimated by evaluating the engine r. p. m. of each cylinder #i after the combustion, and the comparison value for judging whether or not the cylinder at the pertinent combustion stroke has misfired can be set by comparing the evaluated engine r. p. m. with the engine r. p. m. of the cylinder at the adjacent combustion stroke.

Operation

Next, concrete steps for discriminating misfire for each cylinder, which are executed in the electronic control unit 31, will be described in conjunction with the flow charts of FIGS. 1A and 1B.

First, a step (hereinbelow, abbreviated to "S") S101 discriminates the cylinder #i (i=1, 3, 2, 4) at a combustion stroke on the basis of the crank pulse and cam pulse(s) which are respectively delivered from the crank angle sensor 16 and cam angle sensor 18, and an S102 counts up the calculative cycle number Cil of the pertinent cylinder #i at the combustion stroke (C#i-1←C#il+1).

Subsequently, at an S103, the crank pulses for detecting the angles BTDC $\theta 2$ and $\theta 3$ as delivered from the crank angle sensor 16 are discriminated on the basis of the interrupt of the cam pulses, and at an S104, a period f2,3 is calculated from the elapsed time interval between the crank pulses for detecting the angles BTDC $\theta 2$ and $\theta 3$, and the angular difference ($\theta 2 - \theta 3$) between the angles $\theta 2$ and $\theta 3$ (f2,3←dt2,3/d($\theta 2 - \theta 3$)).

Thereafter, at an S105, the engine r. p. m. value N#i of the cylinder #i at the present combustion stroke in the section in which no combustive work is done is calculated from the above period f2,3 (N#i←60/($2\pi \cdot$f2,3)).

At an S106, the ECU 31 reads the engine r. p. m. values set in the last and second-last routines and stored in the predetermined addresses of the RAM 34, that is, the engine r. p. m. N#i−1 of the cylinder #i−1 at the combustion stroke preceding the present combustion stroke one time in the period or section in which no combustive work is done, and the engine r. p. m. N#i−2 of the cylinder #i−2 at the combustion stroke preceding the present combustion stroke two times in the section in which no combustive work is done. Assuming as shown in FIG. 8 that the cylinders are ignited in the order of #1→#3→#2→#4 and that the cylinder #i at the present combustion stroke is #3, the cylinder #−1 at the combustion stroke preceding the present combustion stroke one time becomes the cylinder #1, and the cylinder #−2 at the combustion stroke preceding the present combustion stroke two times becomes the cylinder #4.

Besides, the engine r. p. m. values N#i−1 and N#i−2 in the first routine are set at N#i−1=N#i=2=N#1.

Subsequently, at an S107, the combustion condition comparison value ΔN#i−1 of the cylinder #i−1 at the combustion stroke preceding the present combustion stroke one time is found from the difference between the average value (N#i+N#i−2)/2 of the engine r. p. m. N#i of the cylinder #i at the present combustion stroke in the period or section in which no combustive work is done and the engine r. p. m. N#i−2 of the cylinder #i−2 at the combustion stroke preceding the present combustion stroke two times in the section in which no combustive work is done, and the engine r. p. m. N#i−1 of the cylinder #i−1 at the combustion stroke preceding the present combustion stroke one time in the section in which no combustive work is done:

$$\Delta N\#i-1 \rightarrow N\#i-1-\{(N\#i+N\#i-2)/2\}$$

Thereafter, at an S108, the misfire judgement level $\Delta N_{LEVEL}$ is set in the light of a misfire judgement level map $MP\Delta N_{LEVEL}$ using as parameters the engine r. p. m. N#−1 evaluated in the current routine and engine load data (=fundamental fuel injection pulse width) Tp is calculated on the basis of an intake air quantity Q.

As shown in FIG. 7, the misfire judgement level map $MP\Delta N_{LEVEL}$ constitute a three-dimensional map whose parameters are the engine r. p. m. N#i−1 and the engine load data Tp. Each mesh region of the map stores therein the misfire judgement level $\Delta N_{LEVEL}$ obtained by, e. g., an experiment beforehand.

As shown in FIG. 3, the combustion condition comparison value ΔN#i−1 exhibits a comparatively large fluctuation during an acceleration, but the fluctuating width thereof differs depending upon the operating conditions of the engine. Therefore, the fluctuating widths of the individual operating conditions are evaluated by, e. g., an experiment beforehand, and the misfire judgement levels $\Delta N_{LEVEL}$ conforming to the fluctuating widths are set and mapped, whereby a high accuracy for the misfire judgement can be attained. Incidentally, during a deceleration, substantially no misfire judgement is made because fuel is cut off.

At an S109, the combustion condition comparison value ΔN#i−1 of the cylinder #i−1 at the combustion stroke preceding the present combustion stroke one time is compared with the misfire judgement level $\Delta N_{LEVEL}$. In a case where the combustion condition comparison value ΔN#i−1 has been decided less than the misfire judgement level $\Delta N_{LEVEL}$ (ΔN#i−1<$\Delta N_{LEVEL}$) (refer to FIG. 3), the misfire is judged, and the control flow proceeds to an S110. On the other hand, in a case where ΔN#i−1≧$\Delta N_{LEVEL}$ holds, the normal combustion is judged, and the control flow proceeds to an S111.

The step S110 based on the decision of the misfire counts up the misfire number of each cylinder, C(#i−1)2 which corresponds to the cylinder #i−1 at the combustion stroke preceding the present combustion stroke one time (C(#i−1)2→C(#i−1)2+1), whereupon the control flow proceeds to the S111.

Then, the S111 makes the comparison between the calculative cycle number C#i1 of the cylinder #i at the present combustion stroke and a preset sampling cycle number C#i$_{SET}$ (for example, 100 cycles). In a case (C#i1<C#i$_{SET}$) where the calculative cycle number C#i1 does not reach the sampling cycle number C#i1$_{SET}$, the control flow departs from the routine. On the other hand, in a case (C#i1≧C#i$_{SET}$) where the calculative cycle number C#i1 reaches the sampling cycle number C#i$_{SET}$, the control flow proceeds to an S112, at which the calculative cycle number C#i1 is cleared (C#i1←0).

Subsequently, at an S113, the average misfire number $\overline{C(\#i-1)2)(-1)}$ of each cylinder as corresponds to the cylinder #i−1 at the combustion stroke preceding the present combustion stroke one time, the number being stored in the predetermined address of the RAM 34 and having been calculated in the last sampling period, is read out. At an S114, the average misfire number $\overline{C(\#i-1)2}$ of each cylinder at the current time is evaluated from the weighted average of weight coefficients r indicated by the following formula, on the basis of the average misfire number $\overline{C(\#i-1)2(-1)}$ of each cylinder and the misfire number C(#i−1)2 of each cylinder as corresponds to the cylinder #i−1 at the combustion stroke preceding the present combustion stroke on time and as has been counted in the current sampling cycle number C#i$_{SET}$:

$$\overline{C(\#i-1)2} \leftarrow ((2^r-1) \times \overline{C(\#i-1)2(-1)} + C(\#i-1)2/2^r$$

Since the average misfire number $\overline{C(\#i-1)2}$ of each cylinder is evaluated in accordance with the weighted average, it is possible to correct the misfire judgement error of the cylinder #i−1 at the combustion stroke preceding the present combustion stroke one time and a temporary misfire misjudgement ascribable to an abrupt combustion fluctuation.

Thereafter, at an S115, the misfire number C(190 i−1)2 of each cylinder is cleared (C(#i−1)2←0), and at an S116, the average misfire number $\overline{C(\#i-1)2(-1)}$ of each cylinder calculated in the last sampling period and stored in the predetermined address of the RAM 34 is rewritten into the average misfire number $\overline{C(\#i-1)2}$ of each cylinder calculated at the current time ($\overline{C(\#i-1)2(-1)} \leftarrow \overline{C(\#i-1)2}$).

Next, an S117 makes the comparison between the average misfire number $\overline{C(\#i-1)2}$ of each cylinder at the current time and a misfire abnormality deciding reference number $\overline{C(\#i-1)2_{SET}}$ previously set. In a case where $\overline{C(\#i-1)2} > \overline{C(\#i-1)2_{SET}}$ holds, that is where the average misfire number $\overline{C(\#i-1)2}$ of each cylinder exceeds the misfire abnormality deciding reference number $\overline{C(\#i-1)2_{SET}}$, it is judged that the cylinder #i−1 at the combustion stroke preceding the present combustion stroke one time undergoes a misfire abnormality, and the control flow proceeds top an S118. Here, the misfire abnormality data of the cylinder #i−1 at the combustion stroke preceding the present combustion stroke one time is stored in the predetermined address of the back-up RAM 35, and the driver is warned of the misfire abnormality by lighting up the warning means such as indicator lamp 43, whereupon the routine is left. In contrast, in a case where $\overline{C(\#i-1)2} \leq \overline{C(\#i-1)2_{SET}}$ is decided, it is judged that the cylinder #i−1 at the combustion stroke preceding the present combustion stroke one time does not undergo a misfire abnormality yet, and the routine is left without any processing.

Incidentally, the misfire abnormality data of the cylinder #i−1 at the combustion stroke preceding the present combustion stroke one time as stored in the back-up RAM (memory means) 35 can be read out by connecting the serial monitor 45 to the electronic control unit 31 in, e. g., the service station of a car dealer, thereby to judge the cylinder having misfired. Also, the misfire abnormality data stored in the back-up RAM 35 can be cleared through the serial monitor 45 after a predetermined repair.

Second Embodiment

Figure 9A:
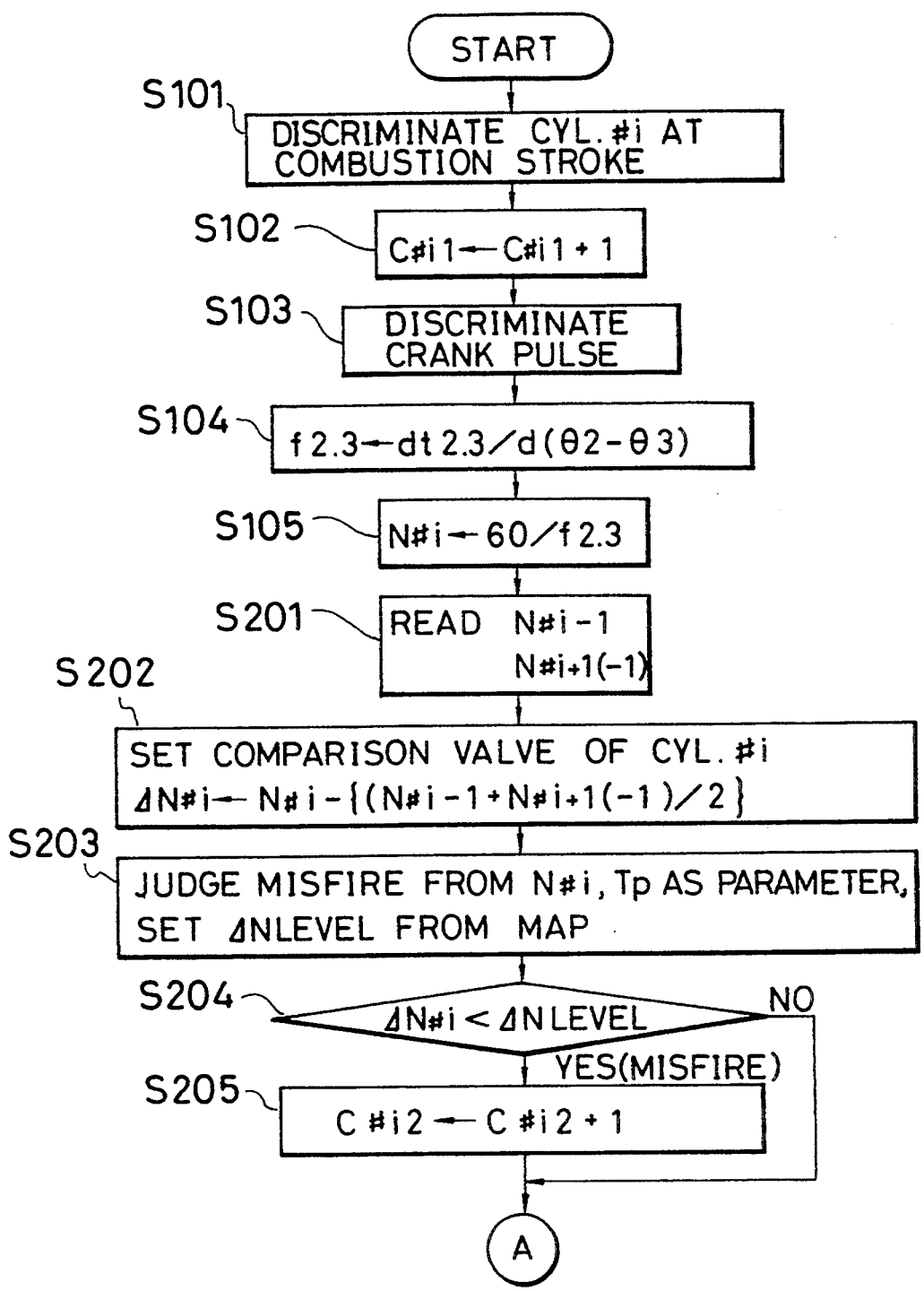
FIGS. 9A and 9B are flow charts showing steps for judging the misfire of each individual cylinder according to the second embodiment of the present invention.
Figure 9B:
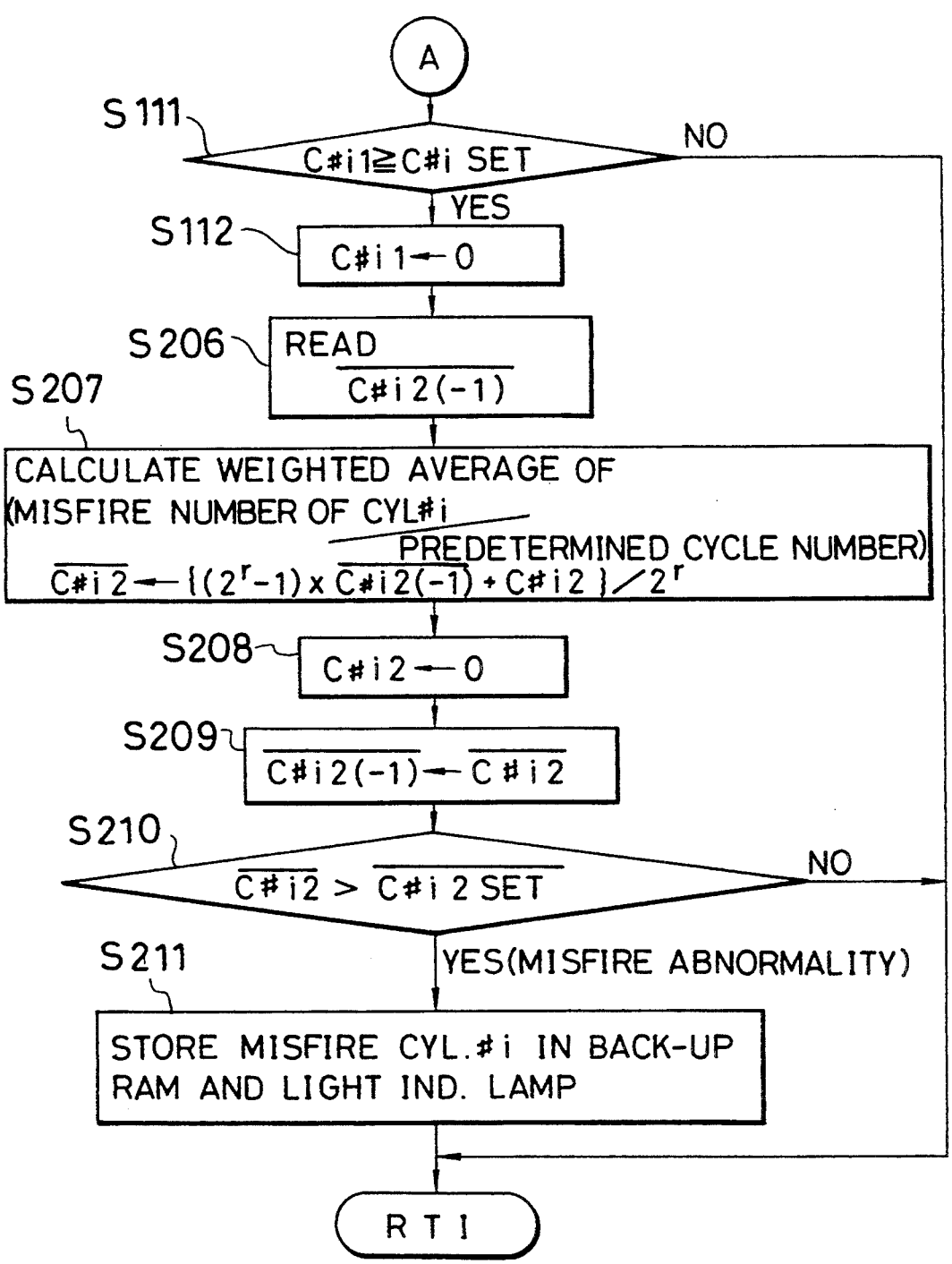

FIGS. 9A and 9B are flow charts showing steps for judging misfire for each cylinder according to the second embodiment of the present invention.

Here, the steps having functions similar to those of the first embodiment are denoted by the same symbols as in the first embodiment and shall be omitted from description.

In this embodiment, the average value between the engine r. p. m. N#i−1 of the cylinder #i−1 at the combustion stroke preceding the present combustion stroke one time, in the period or section in which no combustive work is done after the end of combustion, and the engine r. p. m. (N#i+1(−1)) of the cylinder #i+1 at the combustion stroke succeeding the present combustion stroke one time, in a period or section in which no combustive work is done one cycle before, this r. p. m. N#i+1(−1) being adopted as the estimative value of the pertinent cylinder #i+1 in a period or section in which no combustive work is done, is compared with the engine r. p. m. N#i of the cylinder #i at the present combustion stroke in the period or section in which no combustive work is done. Thus, a combustion condition comparison value for judging the presence of the misfire of the cylinder #i at the present combustion stroke is set.

First, the steps S101 thru S105 proceed in the same way as in the first embodiment (FIG. 1A). An S201 reads out the engine r. p. m. values stored in the RAM 34, namely, the engine r. p. m. N#i−1 of the cylinder #i−1 at the combustion stroke preceding the present combustion stroke one time, in the section in which no combustive work is done, and the engine r. p. m. N#i+1(−1) of the cylinder #i+1 at the combustion stroke succeeding the present combustion stroke one time, in the section in which no combustive work is done one cycle before, this r. p. m. being adopted as the estimative engine r. p. m. of the pertinent cylinder #i+1 in the section in which no combustive work is done. At an S202, the combustion condition comparison value ΔN#i of the cylinder #i at the present combustion stroke is found from the difference between the engine r. p. m. N#i of the cylinder #i evaluated at the S105 and the average value of the engine r. p. m. values N#i−1 and N#i+1(−1) read out at the S201.

$$\Delta N\#i \leftarrow N\#i - \{(N\#i-1 + N\#i+1(-1))/2\}$$

Thereafter, at an S203, the misfire judgement level $\Delta N_{LEVEL}$ is set in the light of a misfire judgement level map $MP\Delta N_{LEVEL}$ using as parameters the engine r. p. m. N#−1 evaluated in the current routine and engine load data (=fundamental fuel injection pulse width) Tp calculated on the basis of an intake air quantity Q.

Incidentally, the misfire judgement level map $MP\Delta N_{LEVEL}$ is the same as in the first embodiment (FIG. 7).

At an S204, the combustion condition comparison value ΔN#i of the cylinder #i at the present combustion stroke is compared with the misfire judgement level $\Delta N_{LEVEL}$. In a case where the combustion condition comparison value ΔN#i has been decided less than the misfire judgment level $\Delta N_{LEVEL}$ (ΔN#i<$\Delta N_{LEVEL}$), the misfire is judged, and the control flow proceeds to an S205. On the other hand, in a case where ΔN#i≧$\Delta N_{LEVEL}$ holds, the normal combustion is judged, and the control flow proceeds to the S111.

The step S205 based on the decision of the misfire counts up the misfire number of each cylinder, C#i2 which corresponds to the cylinder #i at the present combustion stroke (C#i2←C#i2+1), whereupon the control flow proceeds to the S111.

Then, the S111 makes the comparison between the calculative cycle number C#i1 of the cylinder #i at the present combustion stroke and a preset sampling cycle number C#i$_{SET}$ (for example, 100 cycles). In a case (C#i1<C#i$_{SET}$) where the calculative cycle number C#i1 does not reach the sampling cycle number C#i1-$_{SET}$, the control flow leaves the routine. On the other hand, in a case (C#i1≧C#i$_{SET}$) where the calculative cycle number C#i1 reaches the sampling cycle number C#i$_{SET}$, the control flow proceeds to the S112, at which the calculative cycle number C#i1 is cleared (C#i1←0).

Subsequently, at an S206, the average misfire number $\overline{C\#i2(-1)}$ of each cylinder as corresponds to the cylinder #i at the present combustion stroke, the number being stored in the predetermined address of the RAM 34 and having been calculated in the last sampling period, is read out. At an S207, the average misfire number $\overline{C\#i2}$ of each cylinder at the current time is evaluated from the weighted average of weight coefficients r indicated by the following formula, on the basis of the average misfire number $\overline{C\#i2(-1)}$ of each cylinder and the misfire number C#i2 of each cylinder as corresponds to the cylinder #i at the present combustion stroke and as has been counted in the current sampling cycle number C#i$_{SET}$:

$$\overline{C\#i2} \leftarrow \{(2^4-1) \times \overline{C\#i2(-1)} + C\#i2\}/2^4$$

Thereafter, at an S208, the misfire number C#i2 of each cylinder is cleared (C#i2←0), and at an S209, the average misfire number $\overline{C\#i2(-1)}$ of each cylinder corresponding to the cylinder #i at the present combustion stroke, calculated in the last sampling period and stored in the predetermined address of the RAM 34 is rewritten into the average misfire number $\overline{C\#i2}$ of each cylinder calculated at the current time ($\overline{C\#i2(-1)} \leftarrow \overline{C\#i2}$).

Next, an S210 makes the comparison between the average misfire number $\overline{C\#i2}$ of each cylinder at the current time and a misfire abnormality deciding reference number $\overline{C\#i2}_{SET}$ previously set. In a case where $\overline{C\#i2} > \overline{C\#i2}_{SET}$ holds, that is, where the average misfire number $\overline{C\#i2}$ of each cylinder exceeds the misfire abnormality deciding reference number $\overline{C\#i2}_{SET}$, it is judged that the cylinder #i at the present combustion stroke undergoes a misfire abnormality, and the control flow proceeds to an S211. Here, the misfire abnormality data of the cylinder #i at the present combustion stroke is stored in the predetermined address of the back-up RAM 35, and the driver is warned of the misfire abnormality by lighting up the warning means such as indicator lamp 43 (refer to FIG. 4), whereupon the routine is left. In contrast, in a case where $\overline{C\#i2} \leq \overline{C\#i2}_{SET}$ is decided, it is judged that the cylinder #i at the present combustion stroke does not undergo a misfire abnormality yet, and the routine is left without any processing.

According to this embodiment, after the cylinder #i at the present combustion stroke has been discriminated, the combustion condition comparison value $\Delta N\#i$ of the pertinent cylinder #i is immediately set. Therefore, the subsequent calculations are facilitated.

Third Embodiment

Figure 10:
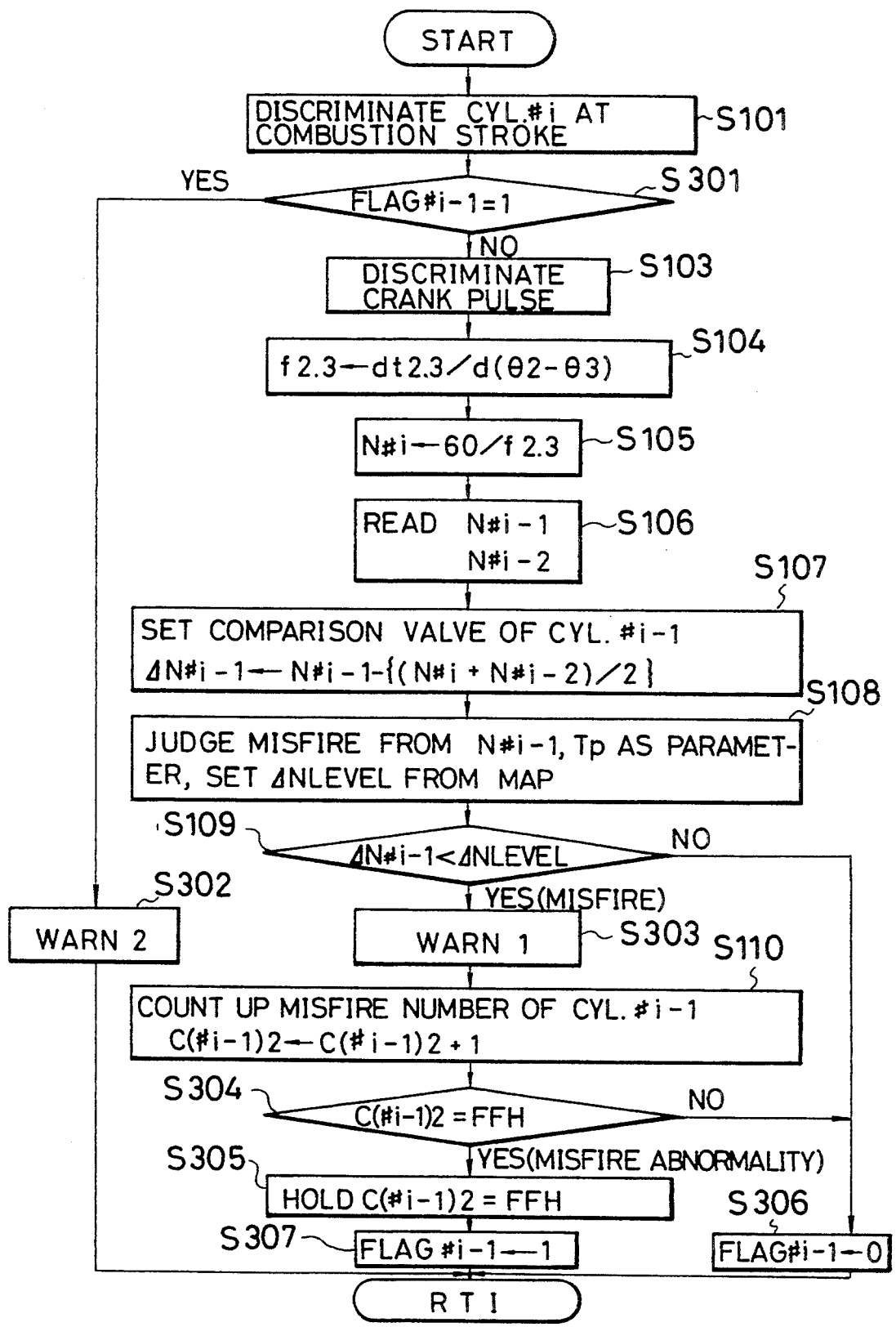
FIG. 10 is a flow chart showing steps of judging the misfire of each individual cylinder according to the third embodiment of the present invention.

FIG. 10 is a flow chart showing steps for discriminating misfire for each cylinder according to the third embodiment of the present invention.

In this embodiment, the numbers of times of misfires are successively stored for the individual cylinders. Besides, when the misfire number has reached the maximum count number, the maximum misfire number is fixed and stored.

First, at the S101, the cylinder #i at the present combustion stroke is discriminated. Thereafter, an S301 decides whether the maximum misfire count number flag FLAG#i−1 of the cylinder #i−1 at the combustion stroke preceding the present combustion stroke one time is in its set status (FLAG#i−1=1) or in its reset status (FLAG#i−1=0). Here, in the case of the set status (FLAG#i−1=1), the control flow proceeds to an S302, at which the driver is warned of the misfire abnormality by lighting up the warning means such as indicator lamp 43 (refer to FIG. 4), whereupon the routine is left.

In contrast, when it has been decided that the maximum misfire count number flag FLAG#i−1 is in the reset status (FLAG#i−1=0), the steps S103–S109 which are the same as in the first embodiment (FIG. 1A) stated before are executed.

When the misfire of the cylinder #i−1 at the combustion stroke preceding the present combustion stroke one time is decided ($\Delta N\#i-1 < \Delta N_{LEVEL}$) at the S109, the control flow proceeds to an S303. In addition, when the normal combustion is decided ($\Delta N\#i-1 \geq \Delta N_{LEVEL}$), the control flow proceeds to an S306, at which the maximum misfire count number flag FLAG#i−1 of the cylinder #i−1 at the combustion stroke preceding the present combustion stroke one time is reset (FLAG#i−1←0), whereupon the routine is left.

On the other hand, when the S109 has been followed by the S303, an indicator lamp or the like is lit up for a very short time, thereby to warn the driver of the occurrence of the misfire.

Upon recognizing the frequence at which the indicator lamp or the like is lit up, the driver can grasp the misfiring situation of the engine, that is, those operating conditions of the engine under which misfires are liable to occur.

Subsequently, at the S110, the misfire number C(#i−1)2 of the cylinder #i−1 at the combustion stroke preceding the present combustion stroke one time is counted up (C(#i−1)2←C(#i−1)2+1), whereupon the value C(#i−1)2 counted up is stored in the predetermined address of the back-up RAM 35.

In, e. g., the service station of the car dealer, the serial monitor 45 is connected to the electronic control unit 31 through the trouble diagnosing connector 44, thereby to read out the data of the misfire number C(#i−1)2 of each cylinder stored in the back-up RAM 35, and the misfiring situation is judged by, e. g., reference to a manual.

Thereafter, an S304 makes the comparison between the misfire number C(#i−1)2 of the cylinder #i−1 at the combustion stroke preceding the present combustion stroke one time and the maximum count number FFH previously set (which can be set as desired in accordance with the capacity of the microcomputer). In case of C(#i−1)2=FFH, the control flow proceeds to an S305, and in case of C(#i−1)2<FFH, the control flow proceeds to the S306.

When the control flow proceeds to the step S305 upon judging that the misfire number C(#i−1)2 reaches the maximum count number FFH (C(#i−1)2=FFH), this misfire number C(#i−1)2 stored in the predetermined address of the back-up RAM 35 is held at the maximum count number FFH. At an S307, the maximum misfire count number flag FLAG#i−1 of the cylinder #i−1 at the combustion stroke preceding the present combustion stroke one time is set (FLAG#i−1←1), whereupon the routine is left.

By the way, in this embodiment, the cylinder whose misfires are to be discriminated may well be the cylinder #i at the present combustion stroke as mentioned in the second embodiment.

Fourth Embodiment

Figure 12:
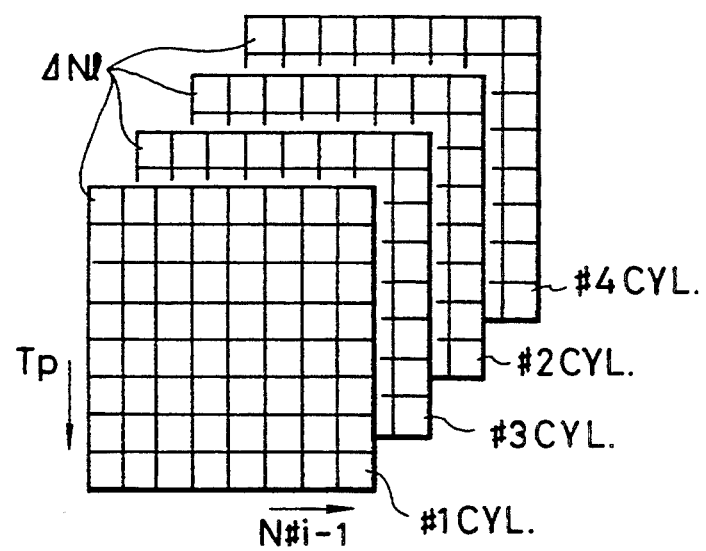
Figure 11A:
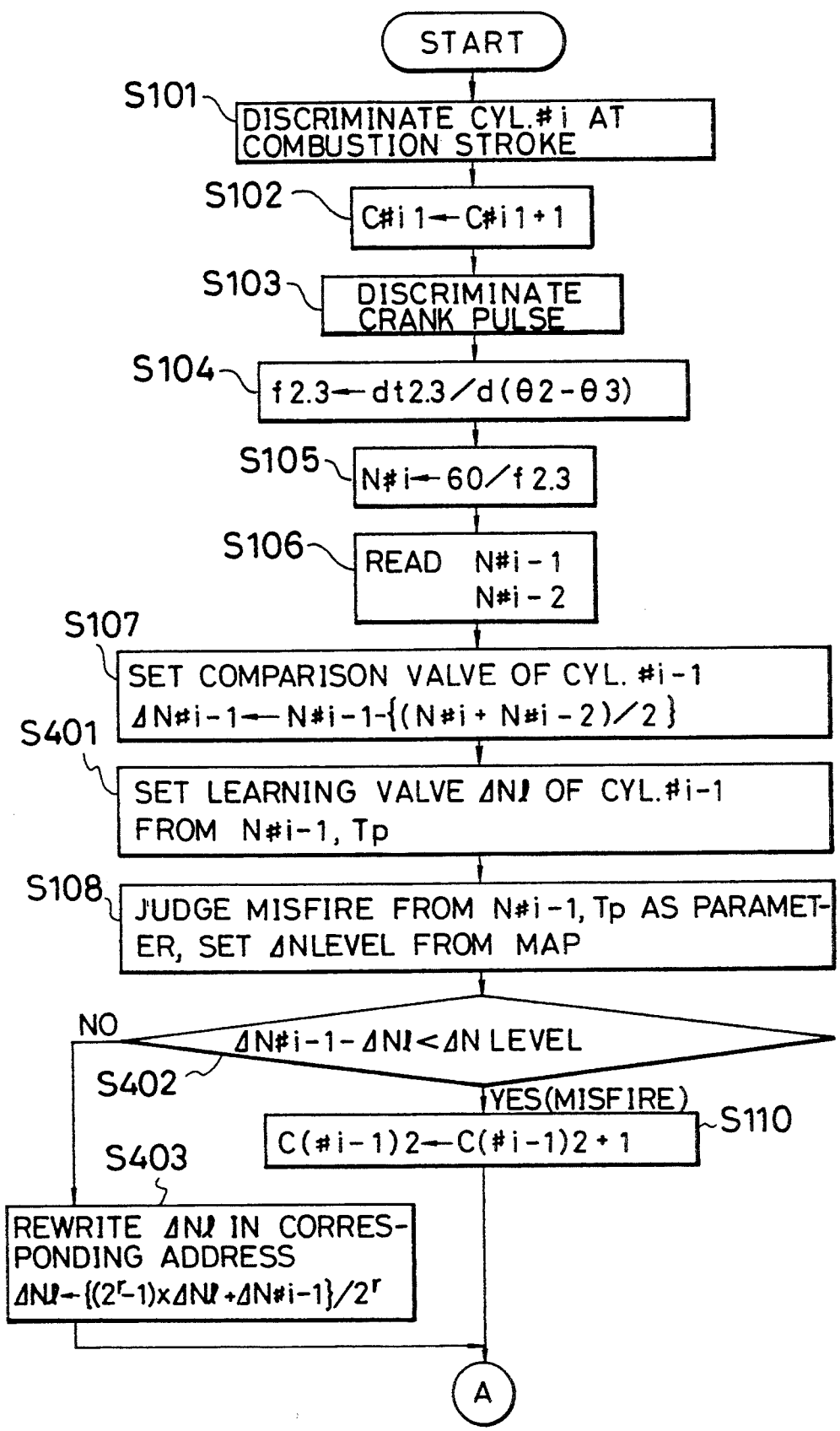
Figure 11B:
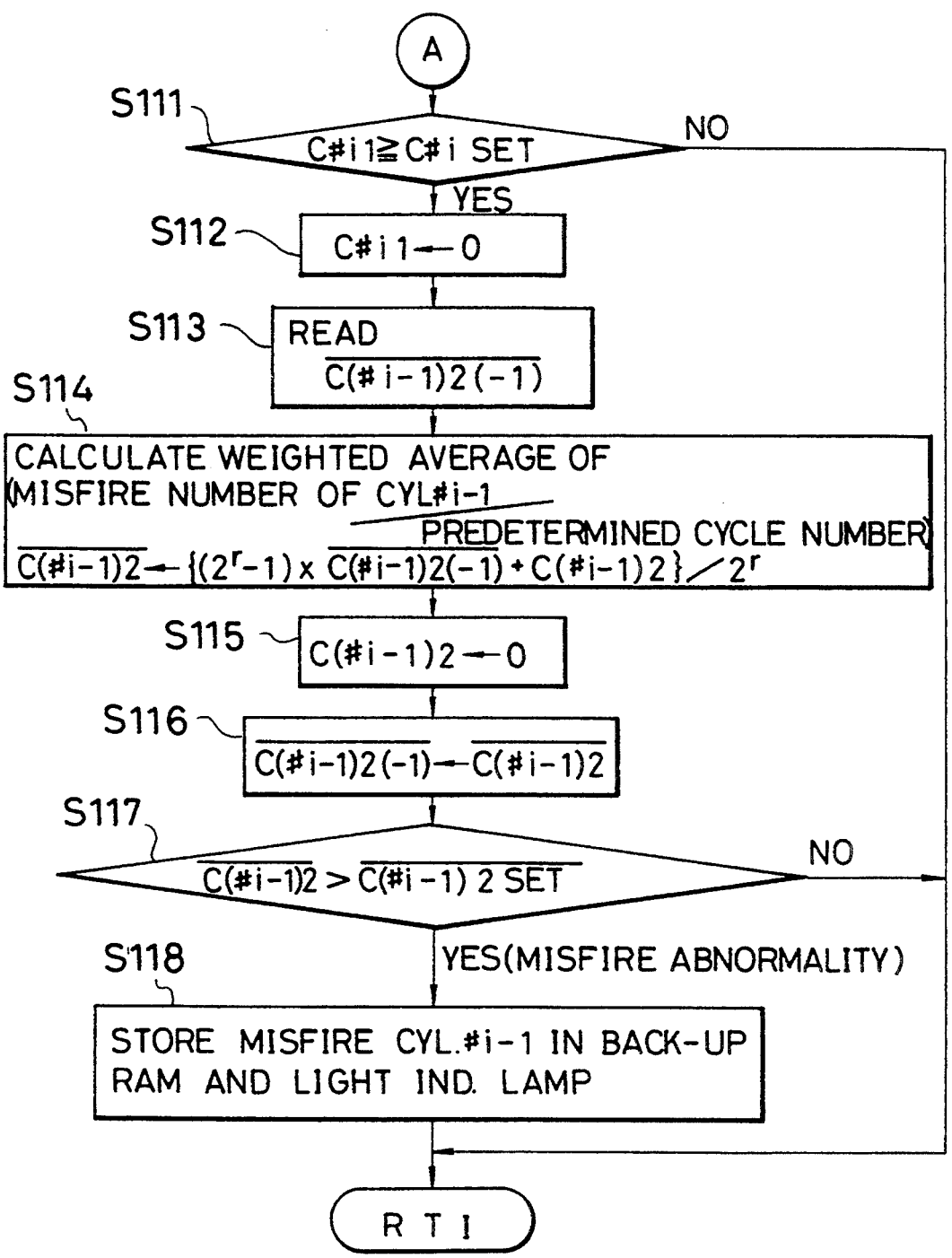

FIGS. 11A and 11B and FIG. 12 illustrate the fourth embodiment of the present invention, in which FIGS. 11A and 11B are flow chart showing steps for judging the misfire of each individual cylinder, and FIG. 12 is a conceptual diagram of combustion condition learning value maps.

In this embodiment, combustion conditions are learnt for the respective cylinders, and the misfire condition of each cylinder is discriminated from the difference between the combustion condition learning value thus obtained and the combustion condition comparing value of the pertinent cylinder calculated on the basis of the engine r. p. m. of the pertinent cylinder in the period or section in which no combustive work is done.

Now, the flow charts of FIGS. 11A and 11B will be referred to.

First, the steps S101 thru S107 proceed in the same was as in the first embodiment (FIG. 1A). At an S401, the combustion condition learning value $\Delta Nl$ of the cylinder #i−1 at the combustion stroke preceding the present combustion stroke one time is set in the light of a combustion condition learning value map MP$\Delta$Nl, using as parameters the engine r. p. m. N#i−1 of the above cylinder #i−1 in the section in which no combustive work is done, this engine r. p. m. N#i−1 having been read out at the S106, and engine load data (=fundamental fuel injection pulse width) Tp calculated on the basis of the engine r. p. m. $N\#i-1$ and an intake air quantity Q.

As shown in FIG. 12, the combustion condition learning value map $MP\Delta N_l$ is a three-dimensional map whose parameters are the engine r. p. m. $N\#i-1$ and the engine load data Tp, and in which the combustion condition learning value $\Delta N_l$ of the corresponding cylinder as set by an S403 to be described later is stored in each mesh region. Such maps are provided in the number of the cylinders.

Subsequently, at the S108, the misfire judgement level $\Delta N_{LEVEL}$ of the cylinder $\#i-1$ at the combustion stroke preceding the present combustion stroke one time is set in the light of the misfire judgement level map $MP\Delta N_{LEVEL}$, using the engine load data Tp and the engine r. p. m. $N\#i-1$ as the parameters. An S402 compares the difference (the resulting compared value) between the combustion condition comparing value $\Delta N\#i-1$ and the combustion condition learning value $\Delta N_l$, with the misfire judgement level $\Delta N_{LEVEL}$.

In case of $\Delta N\#i-1-\Delta N_l < \Delta N_{LEVEL}$, the misfire is decided, and the control flow proceeds to the S110. On the other hand, in case of $\Delta N\#i-1-\Delta N_l \geq \Delta N_{LEVEL}$, the normal combustion is decided, and the control flow proceeds to the S403.

At the S403, the combustion condition learning value $\Delta N_l$ of the cylinder $\#i-1$ at the combustion stroke preceding the present combustion stroke one time is found on the basis of the combustion condition learning value $\Delta N_l$ mentioned before and the combustion condition comparing value $\Delta N\#i-1$, in accordance with the weighted average of the following formula:

$$\Delta N_l \leftarrow \{(2^4-1) \times \Delta N_l + \Delta N\#i-1\}/2^r$$

r: weight of the weighted average.

Besides, data stored in the corresponding address of the combustion condition learning value map $MP\Delta N_l$ of the cylinder $\#i-1$ at the combustion stroke preceding the present combustion stroke one time is rewritten into the combustion condition learning value $\Delta N_l$ obtained anew, whereupon the control flow proceeds to the S111. Incidentally, the initial set value of the combustion condition learning value $\Delta N_l$ of each cylinder stored in the combustion condition learning value map $MP\Delta N_l$ is "0". The reasons are that the ideal combustion condition discrimination value $\Delta N\#i-1$ is "0" (uniform combustion in all the cylinders), and that, under the normal combustion, the combustion condition learning value $\Delta N_l$ obtained according to the weighted average is also considered to result in approaching "0".

The combustion condition learning values $\Delta N_l$ in the normal operations under various operating conditions are learnt as to the respective cylinders, whereby the combustion characteristics of the individual cylinders can be grasped. Besides, in the misfire judgement which is made at the S402, the combustion condition discriminating value $\Delta N\#i-1$ can be relatively compared with the misfire judgement level $\Delta N_{LEVEL}$ after calibrating the fluctuating factors of the characteristics of the pertinent cylinder of the preceding combustion stroke involved in the discriminating value $\Delta N\#i-1(\Delta N\#i-1-\Delta N_l)$.

Accordingly, the accuracy of the judgement is enhanced. Even in, for example, a high revolution region exhibiting comparatively small differences in revolution fluctuations or a multicylinder engine having six or more cylinders, individual misfire conditions can be precisely judged without being affected by the deviation of the characteristics of the individual engines.

On the other hand, when the S402 having judged the misfire is followed by the S110, the misfire number $C(\#i-1)2$ of each cylinder as corresponds to the cylinder $\#i-1$ at the combustion stroke preceding the present combustion stroke one time is counted up ($C(\#i-1)2 \leftarrow C(\#i-1)2+1$), whereupon the control flow proceeds to the S111.

After the same program as in the first embodiment (FIG. 1B) has been run at the steps S111-S118, the control flow leaves the routine.

By the way, in this embodiment, the cylinder whose misfires are to be discriminated may well be the cylinder $\#i$ at the present combustion stroke as mentioned in the second embodiment.

Fifth Embodiment

Figure 13A:
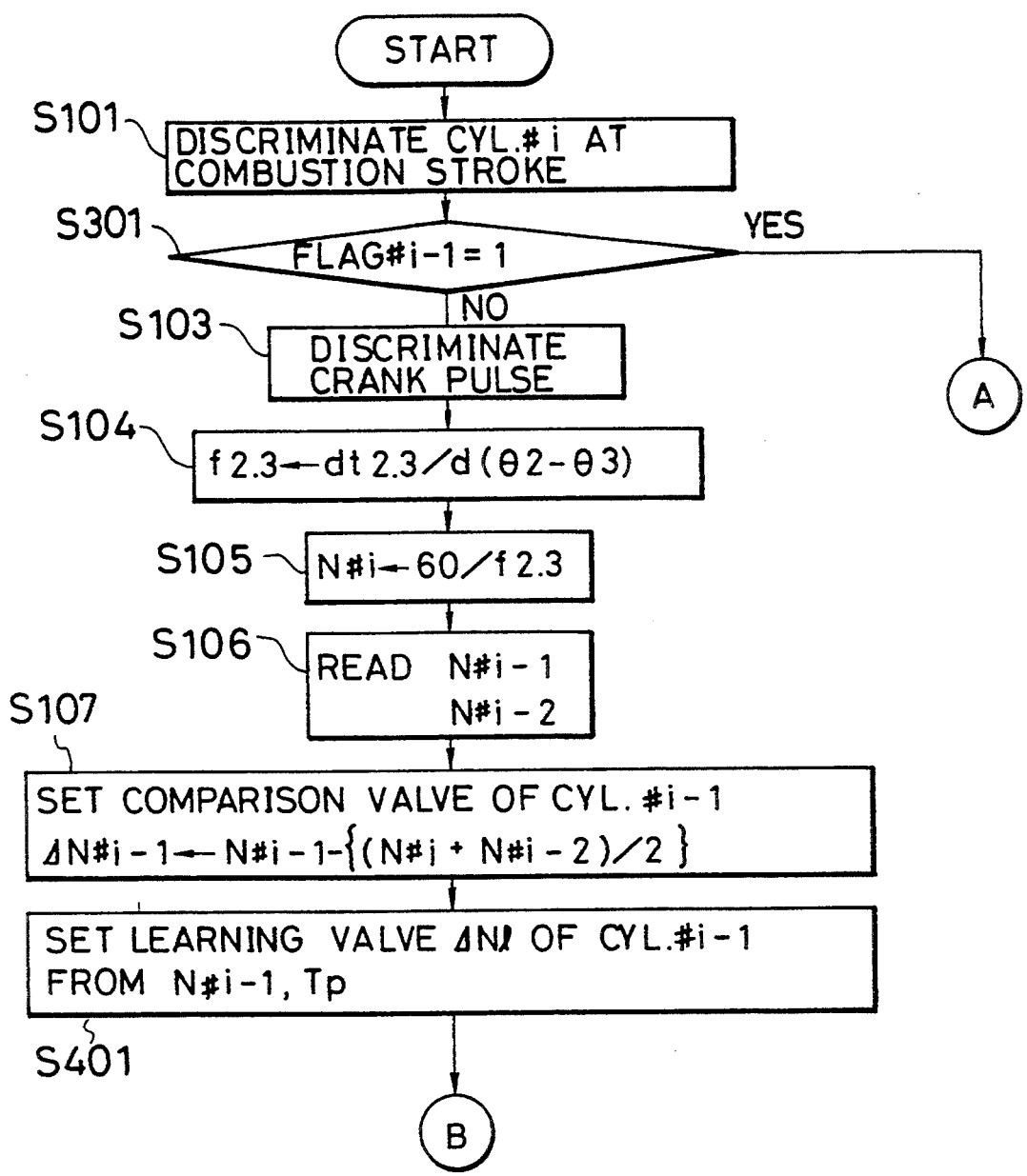

FIGS. 13A and 13B are flow charts showing steps for discriminating misfire for each cylinder according to the fifth embodiment of the present invention.

This embodiment consists in the combination of the third and fourth embodiments. The combustion conditions are learnt for the respective cylinders, the misfire condition is decided from the difference between the combustion condition learning value thus obtained and the combustion condition discriminating value calculated on the basis of the engine r. p. m. of the pertinent cylinder in the section in which no combustive work is done, and the numbers of times of the decided misfires are successively stored for the respective cylinders. In addition, when the misfire number has reached the maximum count number, the maximum misfire number is fixed and stored.

In the flow charts of FIGS. 13A and 13B, the steps of setting the combustion condition learning value (S401), deciding the misfire (S402) and rewriting the combustion condition learning value (S403) indicated in the flow charts of the fourth embodiment (FIGS. 11A and 11B) are incorporated into the flow chart shown in the third embodiment (FIG. 10), whereby the misfires are discriminated for the individual cylinders. The flow charts of this embodiment shall not be further described.

By the way, the present invention is not restricted to the foregoing embodiments, but the combustion condition comparing value, for example, may well be calculated using an angular acceleration, a period, an angular velocity, etc., with the combustive work of each cylinder as the momentum of a designated section.

As described above, according to the first to fifth embodiments of the present invention, there are achieved excellent effects including the effect that a misfire condition can be precisely detected without involving the combustion condition factors of other cylinders and without being affected, not only by the deviation of combustion among the cylinders, but also by the manufacturing dispersion of individual engines.

Now, the sixth to eighth embodiments of the present invention will be described. Each of these embodiments is a method which is applied to the engine control system in FIG. 4 referred to before, and it differs from the first to fifth embodiments in the misfire discriminating steps of the electronic control unit 31. Therefore, only the differences will be clarified without a tedious explanation.

Sixth Embodiment

In the misfire discriminating method of this embodiment, a combustion condition discriminating value $\Delta N\#i-1$ ($\Delta N\#i-1 \leftarrow N\#i-1-(N\#i+N\#i-2)/2$) is first obtained from the difference between the average value $(N\#i-2+N\#i)/2$ of the engine r. p. m. $N\#i$ of the cylinder #i at the present combustion stroke and the engine r. p. m. $N\cdot i-2$ of the cylinder #i−2 at the combustion stroke preceding the present combustion stroke two times, and the engine r. p. m. $N\#i-1$ of the cylinder #i−1 at the combustion stroke preceding the present combustion stroke one time. The discrimination value $\Delta N\#i-1$ is compared with the misfire judgement level $\Delta N_{LEVEL}$ set in accordance with the operating condition of the pertinent cylinder #i−1. In a case where the combustion condition discriminating value $\Delta N\#i-1$ is less than the misfire judgement level $\Delta N_{LEVEL}$, the misfire is judged.

Meanwhile, in the actual engine, the frictions of the respective cylinders are somewhat different on account of the finish accuracy errors, manufactural errors etc. of the bores of the cylinders, the diameters of pistons, etc. In the misfire discrimination, the discrimination value $\Delta N\#i-1$ during the normal combustion deviates among individual engines under the influence of the frictions of the respective cylinders.

In this embodiment, in order to eliminate the fluctuating factors of the respective cylinders attendant upon the frictions, the misfire judgement level $\Delta N_{LEVEL}$ is set as a variable value learnt and amended with the discrimination value $\Delta N\#i-1$ at the cutoff of fuel. Herein, the comparison value for the discrimination of the misfire is set on the basis of the average value of the engine r. p. m. values of the cylinders adjoining each other in the order of ignition. Moreover, the misfire judgement level $\Delta N_{LEVEL}$ is learnt and amended with the discrimination value $\Delta N\#i-1$ at the fuel cutoff, whereby the misfire judgment levels $\Delta N_{LEVEL}$ free from the friction factors are set for the individual cylinders. Therefore, the misfire condition can be precisely detected, not only in the running of the automobile at a constant speed, but also midway of the acceleration thereof.

Next, concrete steps for discriminating misfire for each cylinder, which are executed in the electronic control unit 31, will be described in conjunction with the flow charts of FIGS. 14 thru 16. The steps of the flow charts are performed for the respective cylinders in synchronism with the r. p. m.

First, a step (hereinbelow, abbreviated to "S") S101 discriminates the cylinder #i (i=1, 3, 2, 4) at a combustion stroke on the basis of the crank pulse and cam pulse(s) which are respectively delivered from the crank angle sensor 16 and cam angle sensor 18. Subsequently, at an S102, the crank pulses for detecting the angles BTDC $\theta 2$ and $\theta 3$ as delivered from the crank angle sensor 16 are discriminated on the basis of the interrupt of the cam pulses, and at an S103, a period f2,3 is calculated from the elapsed time interval between the crank pulses for detecting the angles BTDC $\theta 2$ and $\theta 3$, and the angular difference $(\theta 2-\theta 3)$ between the angles $\theta 2$ and $\theta 3$ (f2,3←dt2,3/d($\theta 2-\theta 3$)). Thereafter, at an S104, the engine r. p. m. value $N\#i$ of the cylinder #i at the present combustion stroke in the section in which no combustive work is done is calculated from the above period f2,3 ($N\#i \leftarrow 60/(f2,3)$).

Next, an S105 decides if a fuel cutoff flag $FLAG_{FC}$, which is set by a fuel cutoff discriminating flow chart to be described later, is in its set status ($FLAG_{FC}=1$). In case of $FLAG_{FC}=1$ (fuel cutoff), the control flow proceeds to an S106, whereas in case of $FLAG_{FC}=9$ (fuel injection), the control flow proceeds to an S107.

The S106 decides if a fuel cutoff/cutoff release flag FLAG1, which is set at an S115 or an S133, is in its set status FLAG1=1). In case of FLAG1=0 (last-routine fuel injection), the control flow proceeds to an S108, whereas in case of FLAG1=1 (last-routine fuel cutoff), the control flow proceeds to an S109.

In the case of the proceeding to the S108, which signifies the first routine after the cutoff of fuel, a delay counter COUNT is set to a set value $COUNT_{SET}$ (in this embodiment, $COUNT_{SET}=2$) (COUNT←$COUNT_{SET}$), whereupon the control flow proceeds to the S115. Immediately after the fuel cutoff, the engine r. p. m. values $N\#i-1$ and $N\#i-2$ of the cylinder #i−1 at the combustion stroke preceding the present combustion stroke one time and the cylinder #i−2 at the combustion stroke preceding the present combustion stroke two times are data times at the fuel injection. Therefore, when these values are read out at an S111 to be described later, the frictions of the individual cylinders cannot be detected. Accordingly, the delay counter is set at the S108 in order that the engine r. p. m. values $N\#i-1$ and $N\#i-2$ of the cylinders #i at the combustion strokes corresponding to at least the second routine after the fuel cutoff may be read out at the S111.

On the other hand, when the control flow proceeds to the S109 upon the decision of the last-routine fuel cutoff (FLAG1=1) at the S106, if the delay counter COUNT is "0" is checked. In case of COUNT≠0, the delay counter is decremented at an S110 (COUNT←COUNT−1), whereupon the control flow proceeds to the S115. Besides, when COUNT=0 is decided at the S109, the control flow proceeds to the S111, at which the misfire judgement level $\Delta N_{LEVEL}$ is learnt.

First, at the S111, the ECU 31 reads the engine r. p. m. values set in the last and second-last routines and stored in the predetermined addresses of the RAM 34, that is, the engine r. p. m. $N\#i-1$ of the cylinder #i−1 at the combustion stroke preceding the present combustion stroke one time in the period or section in which no combustive work is done, and the engine r. p. m. $N\#i-2$ of the cylinder #i−2 at the combustion stroke preceding the present combustion stroke two times in the section in which no combustive work is done. Assuming as shown in FIG. 8 that the cylinders are ignited in the order of 190 1→#3→#2→ #4 and that the cylinder #i at the present combustion stroke is #3, the cylinder #i−1 at the combustion stroke preceding the present combustion stroke one time becomes the cylinder #1, and the cylinder #i−2 at the combustion stroke preceding the present combustion stroke two times becomes the cylinder #4.

Subsequently, at an S112, the combustion condition discriminating value $\Delta N\#i-1$ of the cylinder ·i−1 at the combustion stroke preceding the present combustion stroke one time is found from the difference between the average value $(N\#i+N\#i-2)/2$ of the engine r. p. m. $N\#i$ of the cylinder #i at the present combustion stroke in the period or section in which no combustive work is done and the engine r. p. m. $N\#i-2$ of the cylinder #i−2 at the combustion stroke preceding the present combustion stroke two times in the section in which no combustive work is done, and the engine r. p. m. $N\#i-1$ of the cylinder #i−1 at the combustion stroke preceding the present combustion stroke one time in the section in which no combustive work is done:

$$\Delta N\#i-1 \leftarrow N\#i-1 - \{(N\#i+N\#i-2)/2\}$$

Thereafter, at an S113, the misfire judgement level $\Delta N_{LEVEL}$ is set in the light of the misfire judgement level map $MP\Delta N_{LEVEL}$ of the pertinent cylinder #i−1 stored in the back-up RAM 35, using as a parameter the engine r. p. m. N#i−1 of the cylinder #i−1 at the combustion stroke preceding the present combustion stroke one time.

Figure 18:
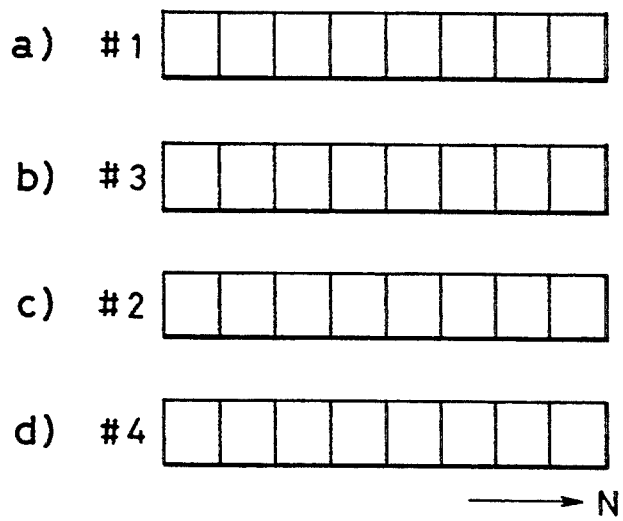
FIG. 18 is a conceptual diagram showing misfire judgement level maps.

As shown in FIG. 18, the misfire judgement level map $MP\Delta N_{LEVEL}$ is a two-dimensional map whose parameter is the engine r. p. m. and in which each mesh region stores the misfire judgement level $\Delta N_{LEVEL}$. Such maps are provided for the respective cylinders. Incidentally, $\Delta N_{SET}$ obtained by, e. g., an experiment beforehand is set as the initial value of each misfire judgement level $\Delta N_{LEVEL}$.

Subsequently, at an S114, a new misfire judgement level is evaluated from the weighted average of weight coefficients r indicated by the following formula, on the basis of the combustion condition discriminating value $\Delta N\#i-1$ and the misfire judgement level $\Delta N_{LEVEL}$ mentioned before, and the data stored at the corresponding address of the misfire judgment level map $MP\Delta N_{LEVEL}$ of the cylinder #i−1 at the combustion stroke preceding the present combustion stroke one time is rewritten, whereupon the control flow proceeds to the S115:

$$\Delta N_{LEVEL} \leftarrow \{(2^r-1) \times \Delta N_{LEVEL} + (\Delta N\#i-1k)\}/2^r$$

k: correction magnitude as an allowance evaluated by, e. g., an experiment beforehand By the way, the frictions which the engine exerts differ in the individual cylinders, so that the misfire judgment levels in various operating conditions need to be learned for the respective cylinders.

When the control flow proceeds from the S108, S110 or S114 to the S115, the fuel cutoff/cutoff release flag FLAG1 is set (FLAG1←1), and the routine is left.

Incidentally, the misfire judgement level $\Delta N_{LEVEL}$ at the S114 may well be rewritten by, for example, the following:

$$\Delta N_{LEVEL} \leftarrow \{(2^r-1) \times \Delta N_{LEVEL} + (\Delta N\#i-1 \times I)\}/2^r$$

I: correction rate (for example, I=1.1) as an allowance previously set by, e. g., an experiment before
Alternatively, in a case where the weighted average is not employed, the following may well be resorted to:

$$\Delta N_{LEVEL} \leftarrow \Delta N\#i-1+k$$

or $$\Delta N_{LEVEL} \leftarrow \Delta N\#i-1 \times I$$

On the other hand, when the control flow proceeds to the S107 upon the decision of the S105 that the fuel cutoff flag $FLAG_{FC}$ is in the reset status ($FLAG_{FC}=0$, fuel injection), if the fuel cutoff/cutoff release flag FLAG1 is in the set status (FLAG1=1) is checked. In case of FLAG1=1 (last-routine fuel cutoff), the control flow proceeds to an S116, and in case of FLAG1=1 (last-routine fuel injection), the control flow proceeds to an S117.

In the case of the proceeding to the S116, which signifies the first routine after the restart of the fuel, the delay counter COUNT is set to the set value $COUNT_{SET}$ (in this embodiment, $COUNT_{SET}=2$) (COUNT←$COUNT_{SET}$), whereupon the control flow proceeds to the S133. Immediately after the restart of the fuel injection, the engine r. p. m. values N#i−1 and N#i−2 of the cylinder #i−1 at the combustion stroke preceding the present combustion stroke one time and the cylinder #i−2 at the combustion stroke preceding the present combustion stroke two times are data items at the fuel cutoff. Therefore, when values read out at an S120 to be described later are used for the misfire judgement, a misjudgement takes place. Therefore, the delay counter is set at the S116 in order that the engine r. p. m. values N#i−1 and N#i−2 of the cylinders #i at the combustion strokes corresponding to at least the second routine after the restart of the fuel injection may be read out at the S120.

On the other hand, when the control flow proceeds to the S117 upon the decision of the last-routine fuel injection (FLAG1=0) at the S107, if the delay counter COUNT is "0" is checked. In case of COUNT≠0, the delay counter is decremented at an S118 (COUNT←COUNT−1), whereupon the control flow proceeds to the S133, Besides, when COUNT=0 is decided at the S117, the control flow proceeds to an S119, at which the misfire of the cylinder #i−1 at the combustion stroke preceding the present combustion stroke is judged.

First, at the S119, the calculative cycle number C#i1 of the cylinder #i at the present combustion stroke is counted up (C#i1←C#i1+1).

Next, at the S120, the ECU 31 reads the engine r. p. m. values set in the last and second-last routines and stored in the predetermined addresses of the RAM 34, that is, the engine r. p. m. N#i−1 of the cylinder #i−1 at the combustion stroke preceding the present combustion stroke one time in the period or section in which no combustive work is done, and the engine r. p. m. N#i−2 of the cylinder #i−2 at the combustion stroke preceding the present combustion stroke two times in the section in which no combustive work is done. At an S121, the combustion condition disciminating value $\Delta N\#i-1$ of the cylinder #i−1 at the combustion stroke preceding the present combustion stroke one time is found from the difference between the average value (N#i+N#i−2)/2 of the engine r. p. m. N#i of the cylinder #i at the present combustion stroke in the period or section in which no combustive work is done and the engine r. p. m. N#i−2 of the cylinder ·i−2 at the combustion stroke preceding the present combustion stroke two times in the section in which no combustive work is done, and the engine r. p. m. N#i−1 of the cylinder #i−1 at the combustion stroke preceding the present combustion stroke one time in the section in which no combustive work is done:

$$\Delta N\#i-1 \leftarrow N\#i-1 - (N\#i+N\#i-2)/2$$

Thereafter, at an S122, the misfire judgement level $\Delta N_{LEVEL}$ is set in the light of the misfire judgement level map $MP\Delta N_{LEVEL}$ using as the parameter the engine r. p. m. N#−1 evaluated in the last routine.

As shown in FIG. 3, the combustion condition discriminating value $\Delta N\#i-1$ exhibits a comparatively large fluctuation during an acceleration, and the fluctuating width thereof differs depending upon the operating conditions of the engine. Since, however, the frictions exerted by the engine are eliminated from the misfire judging factors, a precise discrimination is possible even in a region where the misfire judgement is delicate.

At an S123, the combustion condition discriminating value $\Delta N\#i-1$ of the cylinder $\#i-1$ at the combustion stroke preceding the present combustion stroke one time is compared with the misfire judgement level $\Delta N_{LEVEL}$. In a case where the combustion condition discriminating value $\Delta N\#i-1$ has been decided less than the misfire judgement level $\Delta N_{LEVEL}$ ($\Delta N\#i-1 < \Delta N_{LEVEL}$) (refer to FIG. 3), the misfire is judged, and the control flow proceeds to an S124. On the other hand, in a case where $\Delta N\#i-1 \geq \Delta N_{LEVEL}$ holds, the normal combustion is judged, and the control flow proceeds to an S125.

The step S124 based on the decision of the misfire counts up the misfire number of each cylinder, $C(\#i-1)2$ which corresponds to the cylinder $\#i-1$ at the combustion stroke preceding the present combustion stroke one time ($C(\#i-1)2 \leftarrow C(\#i-1)2+1$), whereupon the control flow proceeds to the S125.

Then, the S125 makes the comparison between the calculative cycle number $C\#i1$ of the cylinder $\#i$ at the present combustion stroke and a preset sampling cycle number $C\#i_{SET}$ (for example, 100 cycles). In a case ($C\#i) < C\#i_{SET}$) where the calculative cycle number $C\#i1$ does not reach the sampling cycle number $C\#i1_{SET}$, the control flow jumps to the S133. On the other hand, in a case ($C\#i1 \geq C\#i_{SET}$) where the calculative cycle number $C\#i1$ reaches the sampling cycle number $C\#i_{SET}$, the control flow proceeds to an S126, at which the calculative cycle number $C\#i1$ is cleared ($C\#i1 \leftarrow 0$).

Subsequently, at an S127, the average misfire number $\overline{C(\#i-1)2}(-1)$ of each cylinder as corresponds to the cylinder $\#i-1$ at the combustion stroke preceding the present combustion stroke one time, the number being stored in the predetermined address of the RAM 34 and having been calculated in the last sampling period, is read out. At an S128, the average misfire number $\overline{C(\#i-1)2}$ of each cylinder at the current time is evaluated from the weighted average of weight coefficients r indicated by the following formula, on the basis of the average misfire number $\overline{C(\#i-1)2}(-1)$ of each cylinder and the misfire number $C(\#i-1)2$ of each cylinder as corresponds to the cylinder $\#i-1$ at the combustion stroke preceding the present combustion stroke one time and as has been counted in the current sampling cycle number $C\#i_{SET}$:

$$\overline{C(\#i-1)2} \leftarrow \{(2^r-1) \times \overline{C(\#i-1)2}(-1) + C(\#i-1)2\}/2^r$$

Since the average misfire number $\overline{C(\#i-1)2}$ of each cylinder is evaluated in accordance with the weighted average, it is possible to correct the misfire judgement error of the cylinder $\#i-1$ at the combustion stroke preceding the present combustion stroke one time and a temporary misfire misjudgement ascribable to an abrupt combustion fluctuation.

Thereafter, at an S129, the misfire number $C(\#i-1)2$ of each cylinder is cleared ($C(\#i-1)2 \leftarrow 0$), and at an S130, the average misfire number $\overline{C(\#i-1)2}(-1)$ of each cylinder calculated in the last sampling period and stored in the predetermined address of the RAM 34 is rewritten into the average misfire number $\overline{C(\#i-1)2}$ of each cylinder calculated at the current time ($\overline{C(\#i-1)2}(-1) \leftarrow \overline{C(\#i-1)2}$).

Next, an S131 makes the comparison between the average misfire number $\overline{C(\#i-1)2}$ of each cylinder at the current time and a misfire abnormality deciding reference number $\overline{C(\#i-1)2}_{SET}$ previously set. In a case where $\overline{C(\#i-1)2} > \overline{C(\#i-1)2}_{SET}$ holds, that is, where the average misfire number $\overline{C(\#i-1)2}$ of each cylinder exceeds the misfire abnormality deciding reference number $\overline{C(\#i-1)2}_{SET}$, it is judged that the cylinder $\#i-1$ at the combustion stroke preceding the present combustion stroke one time undergoes a misfire abnormality, and the control flow proceeds to an S132. Here, the misfire abnormality data of the cylinder $\#i-1$ at the combustion stroke preceding the present combustion stroke one time is stored in the predetermined address of the back-up RAM 35, and the driver is warned of the misfire abnormality by lighting up the warning means such as indicator lamp 43, whereupon the control flow proceeds to the S133. In contrast, in a case where $\overline{C(\#i-1)2} \leq \overline{C(\#i-1)2}_{SET}$ is decided, it is judged that the cylinder $\#i-1$ at the combustion stroke preceding the present combustion stroke one time does not undergo a misfire abnormality yet, and the control flow proceeds to the S133 without any processing.

Incidentally, the misfire abnormality data of the cylinder $\#i-1$ at the combustion stroke preceding the present combustion stroke one time as stored in the back-up RAM (memory means) 35 can be read out by connecting the serial monitor 45 to the electronic control unit 31 in, e. g., the service station of a car dealer, thereby to judge the cylinder having misfired. Also, the misfire abnormality data stored in the back-up RAM 35 can be cleared through the serial monitor 45 after a predetermined repair.

When the control flow proceeds from the S116, S118, S125, S131 or S132 to the S133, the fuel cutoff/cutoff release flag FLAG1 is reset (FLAG1←0), whereupon the routine is left.

Figure 17:
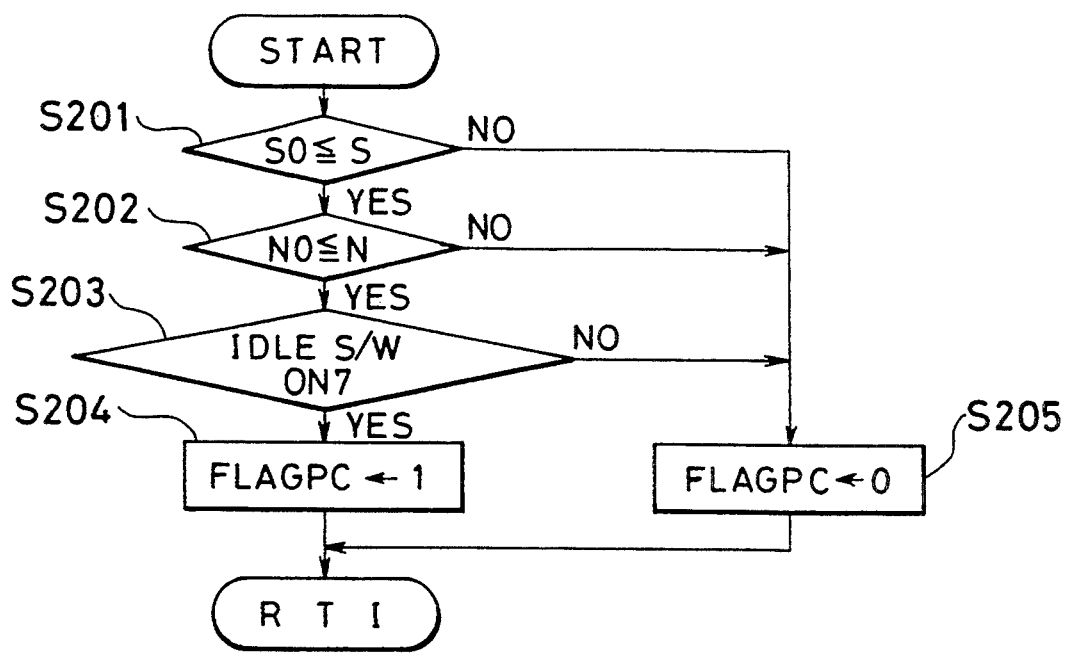
FIG. 17 is a flow chart showing steps for deciding fuel cutoff in the sixth embodiment.

Now, one example of the steps for discriminating the fuel cutoff will be described in conjunction with the flow chart of FIG. 17.

First, an S201 makes the comparison between the speed S of the vehicle and a criterion vehicle speed S0 for the fuel cutoff condition (for example, S0=15 km/hour). In case of S0≦S, the control flow proceeds to an S202, and in case of So>S, the control flow proceeds to an S205.

At the S202, the engine r. p. m. value N is compared with a criterion engine r. p. m. value N0 for the fuel cutoff condition (for example, N0=1500 r. p. m.). Subject to N0≦N, the control flow proceeds to an S203, and subject to N0>N, the control flow proceeds to the S205.

The S203 checks if the idling switch 9b (FIG. 4) is ON. In a case where the idling switch 9b is ON (the throttle value 5a is fully closed), the control flow proceeds to an S204, and in a case where it is OFF (the throttle valve is open), the control flow proceeds to the S205.

At the S204 based on deciding that the fuel cutoff condition holds (S0≦S, N0≦N, and the ON state of the idling switch), the fuel cutoff flag $FLAG_{FC}$ is set ($FLAG_{FC}$←1), and the routine is left.

On the other hand, at the S205 based on deciding that the fuel cutoff condition does not hold (SO>S, N0>N, or the OFF state of the idling switch), the fuel cutoff flag $FLAG_{FC}$ is reset ($FLAG_{FC} \leftarrow 0$), and the routine is left.

Seventh Embodiment

Figure 19:
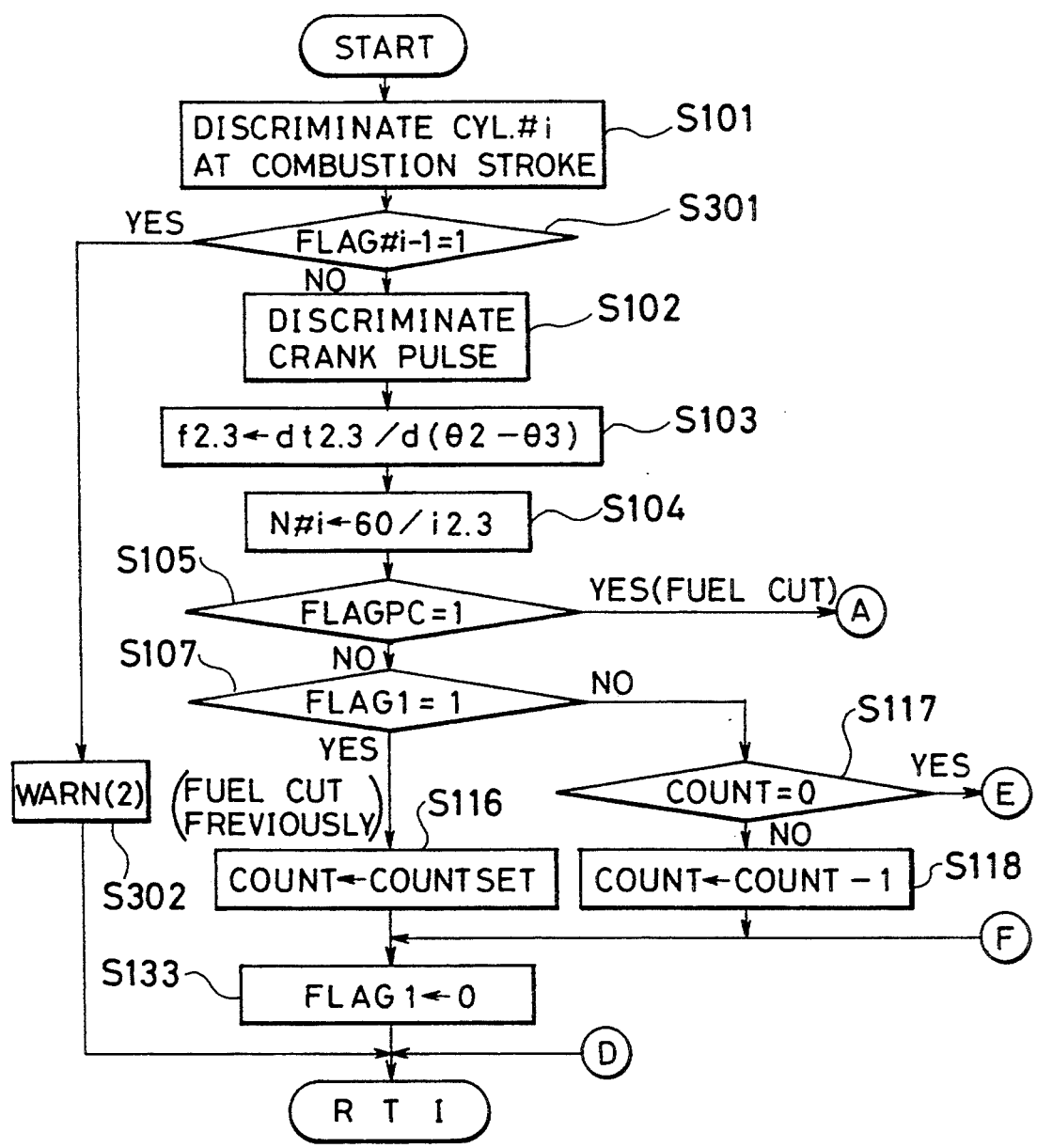
FIGS. 19 and 20 are flow charts showing steps for judging the misfire of each individual cylinder according to the seventh embodiment of the present invention.
Figure 20:
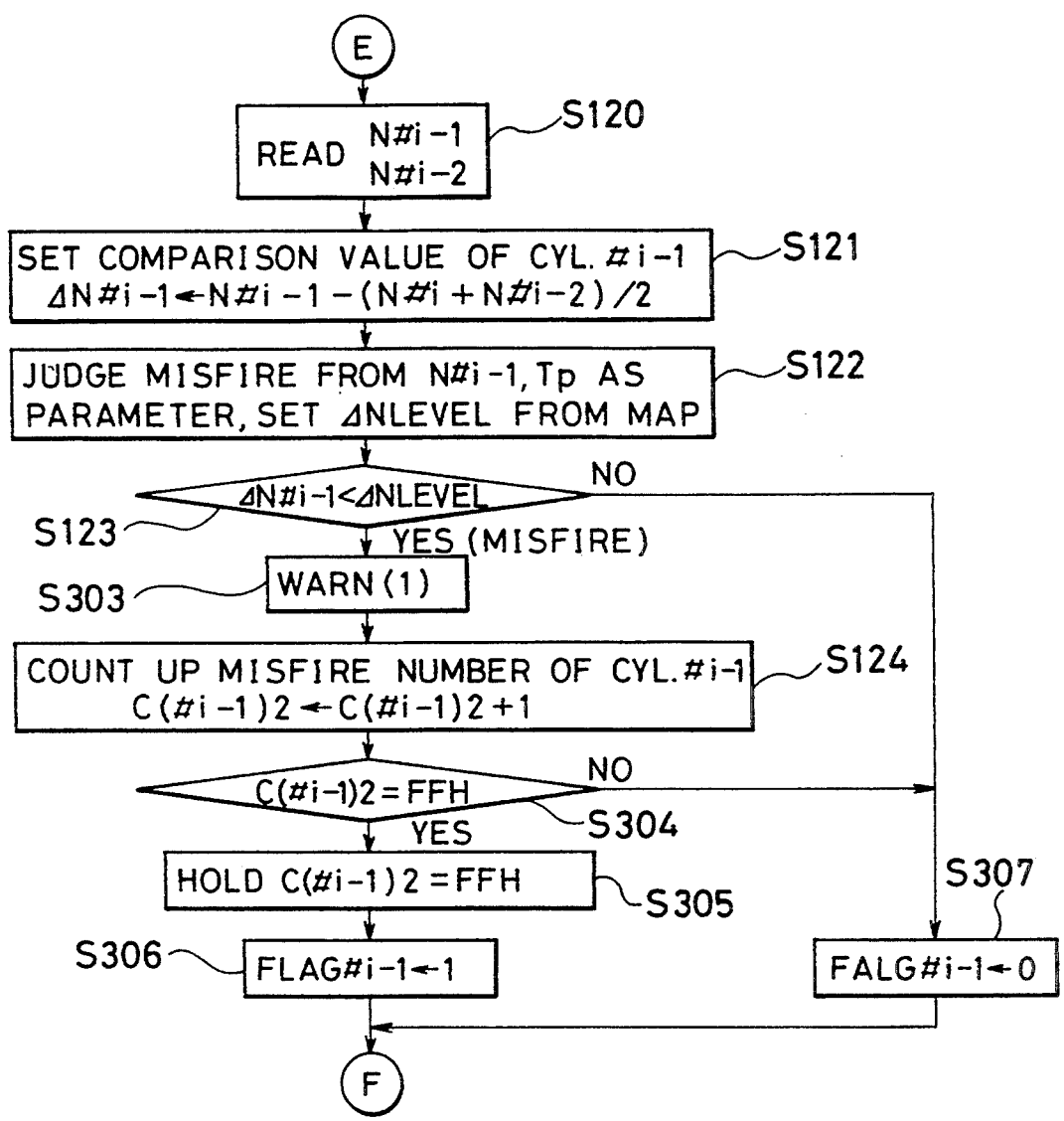

FIGS. 19 and 20 are flow charts showing steps for discriminating misfire for each cylinder according to the seventh embodiment of the present invention.

In this embodiment, the numbers of times of misfires are successively stored for the individual cylinders. Besides, when the misfire number has reached the maximum count number, the maximum misfire number is fixed and stored.

First, at the S101, the cylinder #i at the present combustion stroke is discriminated. Thereafter, an S301 decides whether the maximum misfire count number flag $FLAG\pi i-1$ of the cylinder #i−1 at the combustion stroke preceding the present combustion stroke one time is in its set status ($FLAG\#i-1=1$) or in its reset status ($FLAG\#i-1=0$). Here, in case of the set status ($FLAG\#i-1=1$), the control flow proceeds to an S302, at which the driver is warned of the misfire abnormality by lighting up the warning means such as indicator lamp 43 (refer to FIG. 4), whereupon the routine is left.

Figure 14:
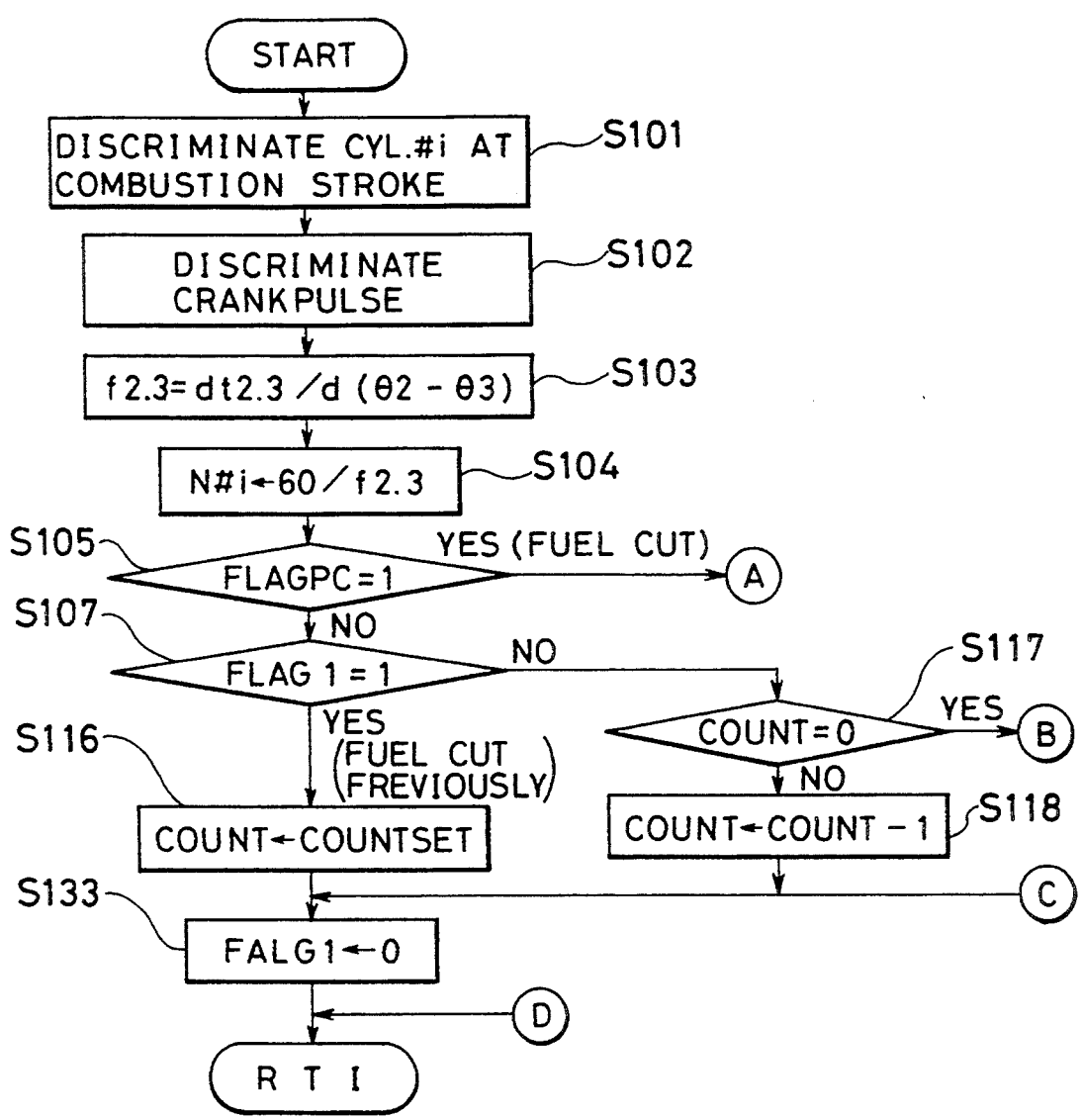
FIGS. 14 thru 16 are flow charts showing steps for discriminating the misfire of each individual cylinder according to the sixth embodiment of the present invention.
Figure 15:
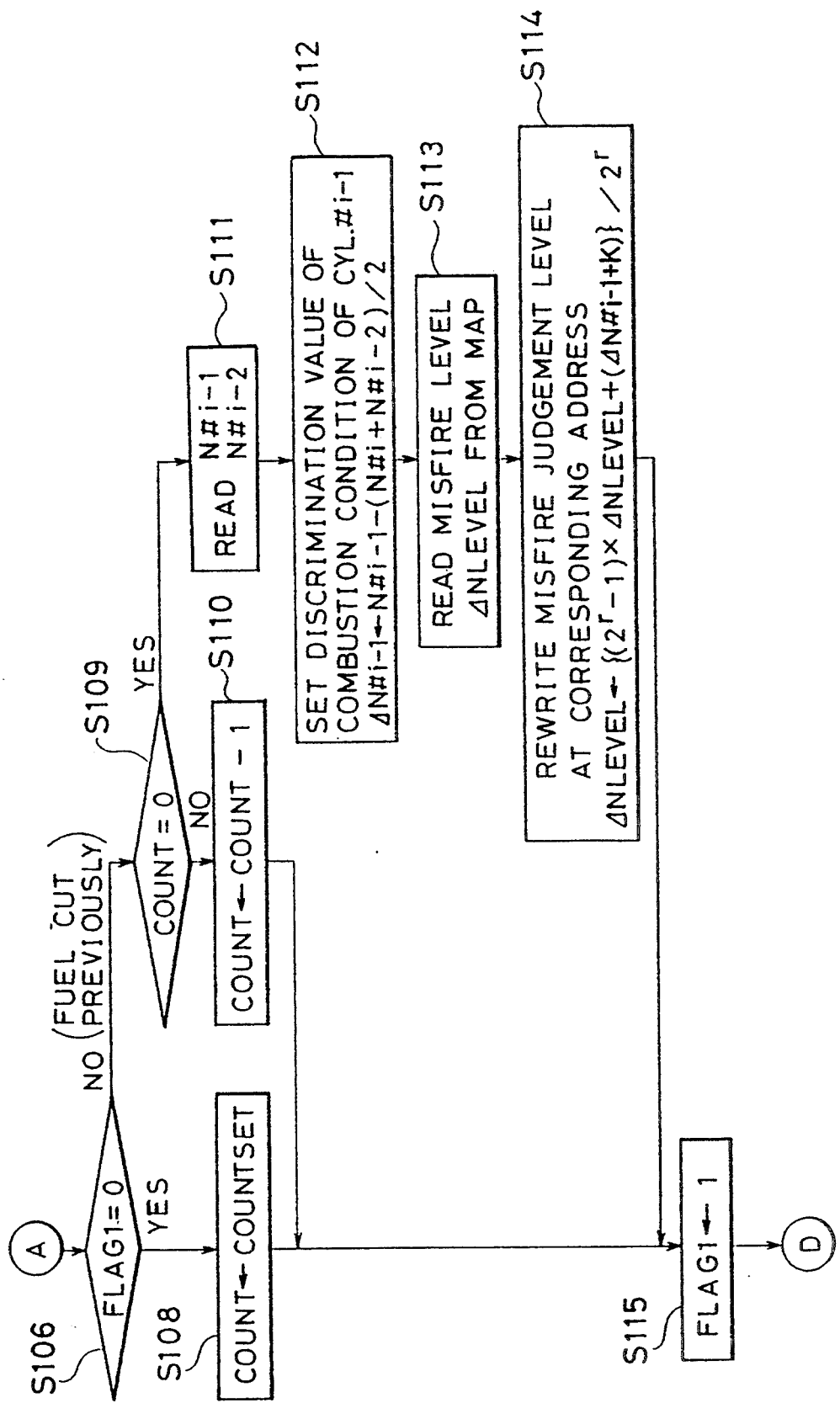
Figure 16:
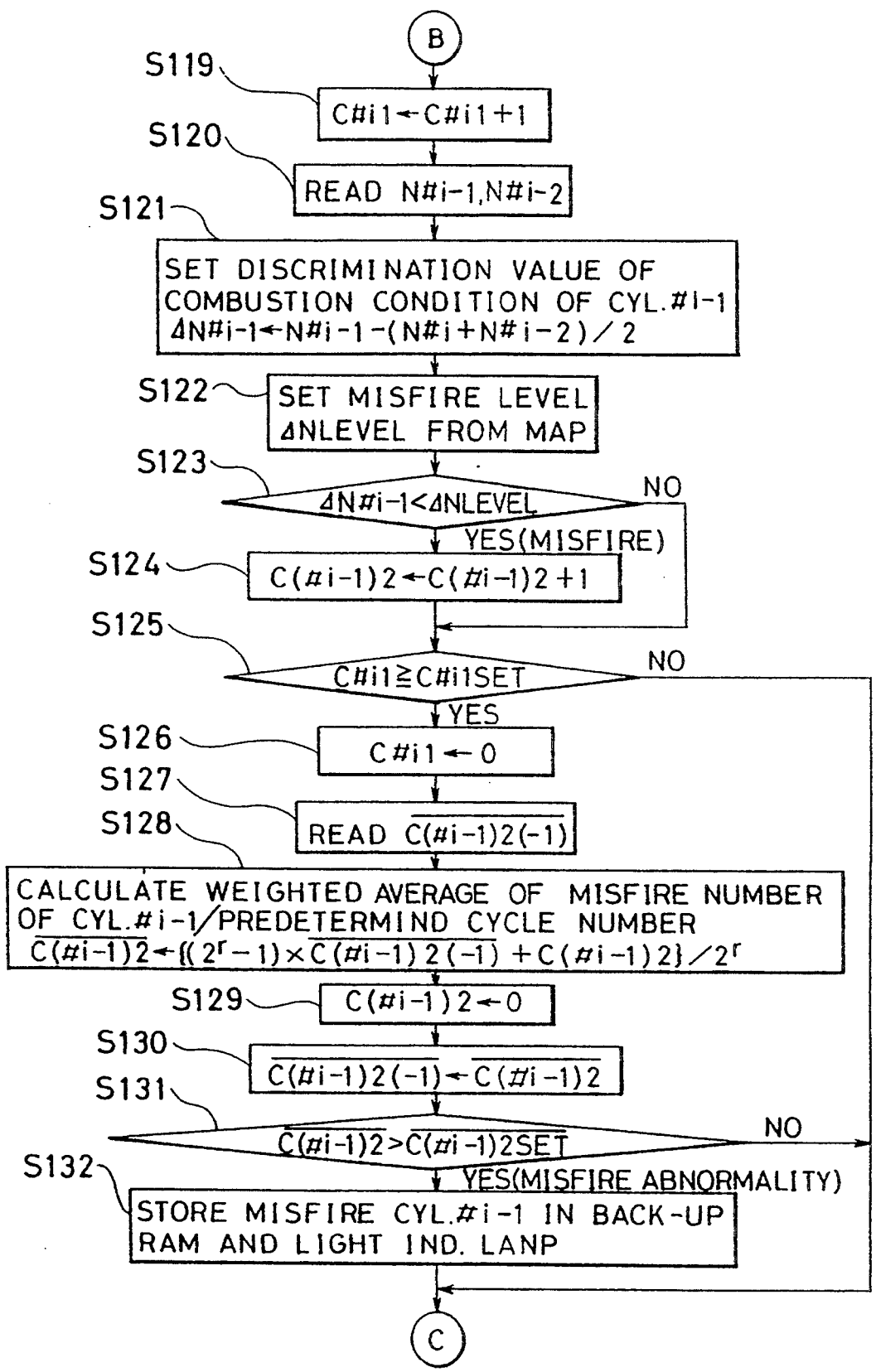

In contrast, when it has been decided that the maximum misfire count number flag $FLAG\#i-1$ is in the reset status ($FLAG\#i-1=0$), the steps S102−S123 (except the S119 not executed) which are the same as in the sixth embodiment (FIGS. 14 and 15) stated before are executed (since the steps S106−S115 are the same as in FIG. 15, refer to this figure).

When the misfire of the cylinder #i−1 at the combustion stroke preceding the present combustion stroke one time is decided ($\Delta N\#i-1 < \Delta N_{LEVEL}$) at the S123, the control flow proceeds to an S303, and an indicator lamp or the like is lit up for a very short time so as to warn the drier of the occurrence of the misfire, whereupon the control flow proceeds to an S124.

Upon recognizing the frequence at which the indicator lamp or the like is lit up, the driver can grasp the misfire situation of the engine, that is, those operating conditions of the engine under which misfires are liable to occur.

In addition, when the normal combustion is decided ($\Delta N\#i-1 \geq \Delta N_{LEVEL}$) at the S123, the control flow proceeds to an S307, at which the maximum misfire count number flag $FLAG\#i-1$ of the cylinder #i−1 at the combustion stroke preceding the present combustion stroke one time is reset ($FLAG\#i-1 \leftarrow 0$), whereupon it proceeds to an S133.

Subsequently, at the S124, the misfire number $C(\#i-1)2$ of the cylinder #i−1 at the combustion stroke preceding the present combustion stroke one time is counted up ($C(\#i-1)2 \leftarrow C(\#i-1)2+1$), whereupon the value $C(\#i-1)2$ counted up is stored in the predetermined address of the back-up RAM 35.

In, e. g., the service station of the car dealer, the serial monitor 45 is connected to the electronic control unit 31 through the trouble diagnosing connector 44, thereby to read out the data of the misfire number $C(\#i-1)2$ of each cylinder stored in the back-up RAM 35, and the misfiring situation is judged by, e. g., reference to a manual.

Thereafter, an S304 makes the comparison between the misfire number $C(\#i-1)2$ of the cylinder #i−1 at the combustion stroke preceding the present combustion stroke one time and the maximum count number FFH previously set (which can be set as desired in accordance with the capacity of the microcomputer). In case of $C(\#i-1)2=FFH$, the control flow proceeds to an S305, an din case of $C(\#i-1)2<FFH$, the control flow proceeds to the S307.

When the control flow proceeds to the step S305 upon judging that the misfire number $C(\#i-1)2$ reaches the maximum count number FFH ($C(\#i-1)2=FFH$), this misfire number $C(\#i-1)2$ stored in the predetermined address of the back-up RAM 35 is held at the maximum count number FFH. At an S306, the maximum misfire count number flag $FLAG\#i-1$ of the cylinder #i−1 at the combustion stroke preceding the present combustion stroke one time is set ($FLAG\#i-1 \leftarrow 1$), whereupon the routine is left.

Eighth Embodiment

Figure 21:
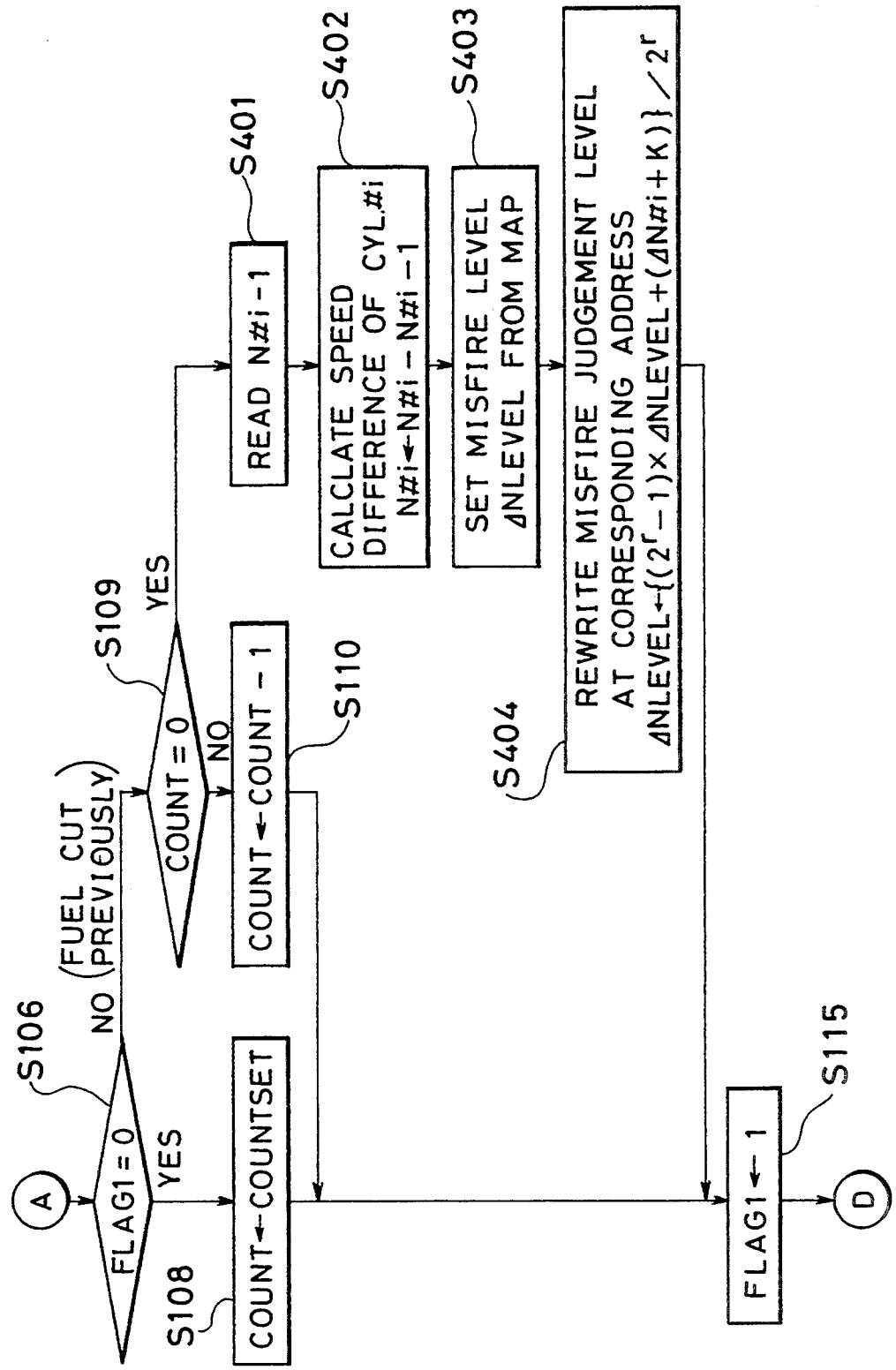
FIGS. 21 and 22 are flow charts showing steps for judging the misfire of each individual cylinder according to the eighth embodiment of the present invention.
Figure 22:
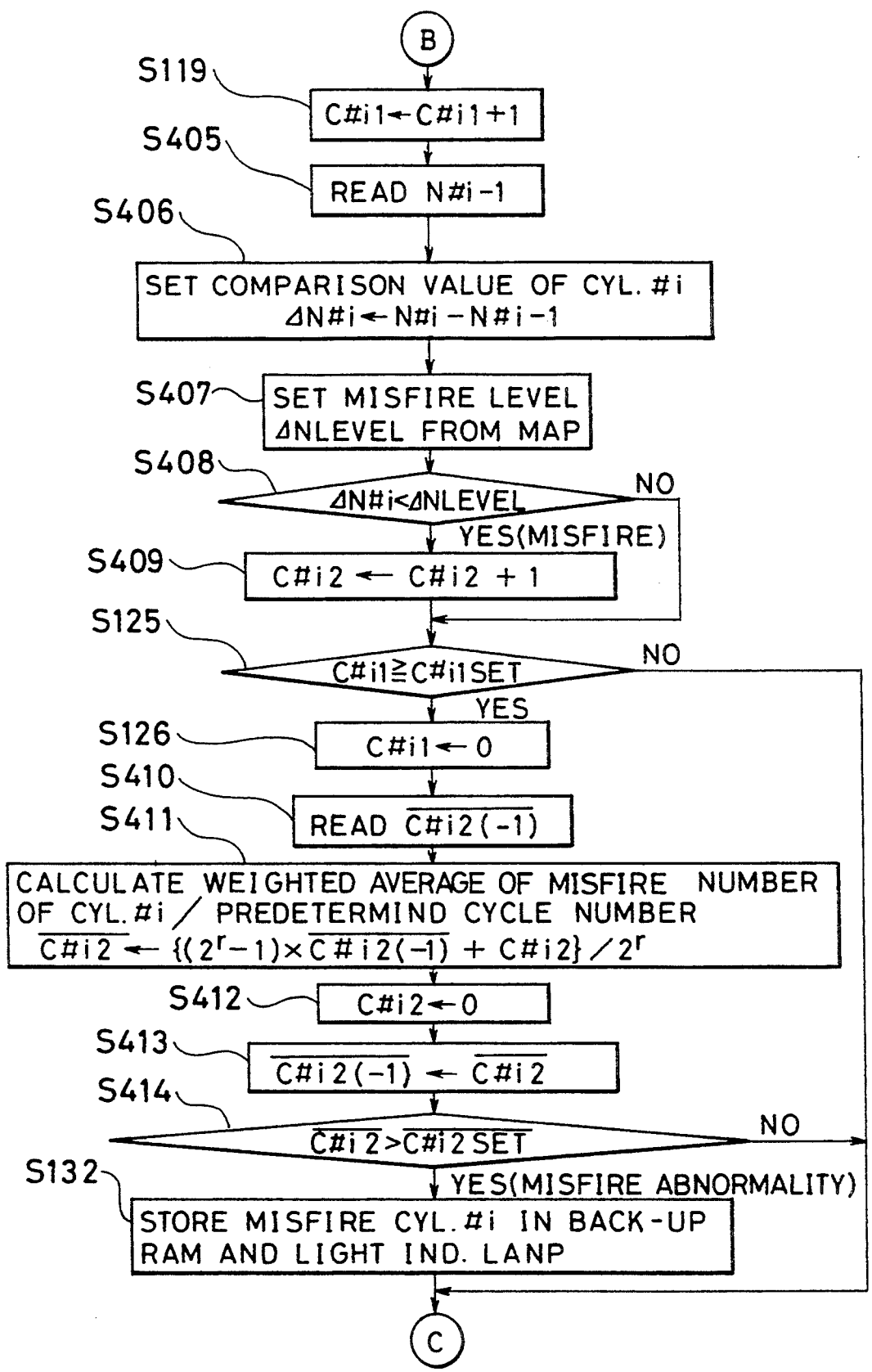

FIGS. 21 and 22 are flow charts showing steps for discriminating misfire for each cylinder according to the eight embodiment of the present invention.

In this embodiment, a misfire judgement level $\Delta N_{LEVEL}$ stored in the corresponding operating region of the misfire judgment level map $MP\Delta N_{LEVEL}$ of the cylinder #i at the present combustion stroke is amended and learnt on the basis of the differential r. p. m. $\Delta N\#i$ between the engine r. p. m. $N\#i$ of the pertinent cylinder #i in the period or section in which no combustive work is done and the engine r. p. m. $N\#i-1$ if the cylinder #i−1 at the combustion stroke preceding the present combustion stroke one time, in the period or section in which no combustive work is done.

Now, the flow charts will be referred to the same routines as in the sixth embodiment have the same symbols assigned thereto, and they shall be omitted from description.

First, the steps S101−S110 which are the same as in the sixth embodiment are executed (refer to FIGS. 14 and 21). At steps S401 et seq., the misfire judgement level $\Delta N_{LEVEL}$ is learnt.

At the S401, the ECU 31 reads the engine r. p. m. value set in the last routine and stored in the predetermined address of the RAM 34, that is, the engine r. p. m. $N\#i-1$ of the cylinder #i−1 at the combustion stroke preceding the present combustion stroke one time in the period or section in which no combustive work is done. At the S402, the differential r. p. m. value $\Delta N\#i$ of the cylinder #i at the present combustion stroke is found from the difference between the above engine r. p. m. $N\#i-1$ and the engine r. p. m. of the cylinder #i at the present combustion stroke in the period or section in which no combustive work is done ($\Delta N\#i \leftarrow N\#i-N\#i-1$).

Besides, at the S403, the misfire judgement level $\Delta N_{LEVEL}$ is set in the light of the misfire judgement level map $MP\Delta N_{LEVEL}$ (refer to FIG. 18) of the pertinent cylinder #i stored in the back-up RAM 35, using the engine r. p. m. $N\#i$ as a parameter.

Subsequently, at the S404, a new misfire judgement level is evaluated from the weighted average of weight coefficients r indicated by the following formula, on the basis of the differential r. p. m. $\Delta N\#i$ and the misfire judgement level $\Delta N_{LEVEL}$ mentioned before, and the data stored at the corresponding address of the misfire judgment level map $MP\Delta N_{LEVEL}$ of the cylinder #i at the present combustion stroke is rewritten, whereupon the control flow proceeds to the S115:

$$\Delta N_{LEVEL} \leftarrow \{(2^4-1) \times \Delta N_{LEVEL} + (\Delta N\#i+k)\}/2^r$$

Meanwhile, the steps S116–S119 which are the same as in the sixth embodiment are executed (refer to FIGS. 14 and 22). At steps S405 et seq., the misfire of the cylinder #i at the present combustion stroke is judged.

First, at the S405, the ECU 31 reads the engine r. p. m. N#i−1 of the cylinder #i−1 at the combustion stroke preceding the present combustion stroke one time. At the S406, the combustion condition discriminating value ΔN#i of the cyidnler #i at the present combustion stroke is found from the difference between the above engine r. p. m. N#i−1 and the engine r. p. m. of the cylinder #i at the present combustion stroke (ΔN#i←N#i−N#i−1).

Besides, at the S407, the misfire judgement level ΔN$_{LEVEL}$ is set in the light of the misfire judgement level map MPΔN$_{LEVEL}$, using the engine r. p. m. N#i as the parameter.

At the S408, the combustion condition discriminating value ΔN#i is compared with the misfire judgement level ΔN$_{LEVEL}$. In case of ΔN#i<ΔN$_{LEVEL}$ (refer to FIG. 3), the misfire is judged, and the control flow proceeds to the S409. On the other hand, in case of ΔN#i−1≧ΔN$_{LEVEL}$, the normal combustion is judged, and the control flow proceeds to the S125.

The step S409 based on the decision of the misfire counts up the misfire number of each cylinder, C#i2 of the cylinder #i at the present combustion stroke (C#i-2←C#i2+1), whereupon the control flow proceeds to the S125.

Thereafter, when the steps S125 and S126 are followed by the S410, the ECU 31 reads out the average misfire number $\overline{C\#i2}$(−1) of each cylinder as corresponds to the cylinder #i at the present combustion stroke, the number being stored in the predetermined address of the RAM 34 and having been calculated in the last sampling period. At the S411, the average misfire number $\overline{C\#i2}$ of each cylinder at the current time is evaluated from the weighted average of weight coefficients r indicated by the following formula, on the basis of the average misfire number $\overline{C\#i2}$(−1) of each cylinder and the misfire number C#i2 of each cylinder as corresponds to the cylinder #i at the present combustion stroke and as has been counted in the current sampling cycle number C#i1$_{SET}$:

$$\overline{C\#i2}\leftarrow\{(2^r-1)\times\overline{C\#i2(-1)}+C\#i2\}/2^r$$

Thereafter, at the S412, the misfire number C#i2 of each cylinder is cleared (C#2←0), and at the $\overline{S413}$, the average misfire number $\overline{C\#i2}$(−1) of each cylinder calculated in the last sampling period and stored in the predetermined address of the RAM 34 is rewritten into the average misfire number $\overline{C\#i2}$ of each cylinder calculated at the current time $\overline{(C\#i2(-1)\leftarrow C\#i2)}$.

Next, the S414 makes the comparison between the average misfire number $\overline{C\#i2}$ of each cylinder at the current time and a misfire abnormality deciding reference number $\overline{C\#i2_{SET}}$ previously set. In a case where $\overline{C\#i2}>\overline{C\#i2_{SET}}$ holds, that is, where the average misfire number $\overline{C\#i2}$ of each cylinder exceeds the misfire abnormality deciding reference number $\overline{C\#i2_{SET}}$, it is judged that the cylinder #i at the present combustion stroke undergoes a misfire abnormality, and the control flow proceeds to the S132. In contrast, in a case where $C\#i2\leqq C\#i2_{SET}$ is decided, it is judged that the cylinder #i at the present combustion stroke does not undergo a misfire abnormality yet, and the control flow proceeds to the S133 (refer to FIG. 14) without any processing.

Also in each of the sixth to eighth embodiments, the combustion condition discriminating value, for example, may well be calculated using an angular acceleration, a period, an angular velocity, etc., with the combustive work of each cylinder as the momentum of a designated section.

As described above, according to the sixth to eighth embodiments of the present invention, there are achieved excellent effects including the effect that a misfire condition can be precisely detected without involving the combustion condition factors of other cylinders and without being affected, not only by the deviation of combustion among the cylinders, but also by the manufacturing dispersion of individual engines or the frictions of the engine.

What is claimed is:

1. A method for discriminating a misfire occurrence of an engine having a plurality of cylinders, comprising:
   detecting sequentially a plurality of engine speeds, each of said engine speeds being detected in a period after a combustion in each cylinder of said engine with respect to an ignition sequence of all cylinders;
   detecting a variation in said detected engine speeds;
   setting a misfire judgment level as a function of an engine parameter representing an operation condition of the engine;
   comparing said variation with said misfire judgment level;
   judging a misfire occurrence in one of said cylinders when said variation is larger than said misfire judgment level; and
   renewing said misfire judgement level according to a plurality of engine speeds sequentially detected during a fuel cutoff state of the engine.

2. A system for discriminating a misfire occurrence of an engine having a plurality of cylinders, comprising:
   engine speed detecting means for detecting sequentially a plurality of engine speeds, each of said engine speeds being detected in a period after a combustion in each cylinder of said engine with respect to an ignition sequence of all cylinders;
   variation detecting means for detecting a variation in said detected engine speeds;
   setting means for setting a misfire judgment level as a function of an engine parameter representing an operation condition of the engine;
   comparing means for comparing said variation with said misfire judgment level;
   judging means for judging a misfire occurrence in one of said cylinders when said variation is larger than said misfire judgment level; and
   renewing means for renewing said misfire judgement level according to a plurality of engine speeds sequentially detected during a fuel cutoff state of the engine.

* * * * *